United States Patent [19]

Tada et al.

[11] Patent Number: 5,412,471
[45] Date of Patent: May 2, 1995

[54] OPTICAL GYRO WITH EXPANDED DETECTABLE RANGE OF INPUT ROTATION ANGULAR VELOCITY AND OPTICAL WAVEGUIDE-TYPE PHASE MODULATOR USED IN THE SAME

[75] Inventors: Hirohiko Tada; Kurokawa: Akihiro, both of Kamakura, Japan

[73] Assignee: Mitsubishi Precision Co., Ltd., Tokyo, Japan

[21] Appl. No.: 840,535

[22] Filed: Feb. 25, 1992

[30] Foreign Application Priority Data

| Mar. 12, 1991 | [JP] | Japan | 3-046827 |
| May 16, 1991 | [JP] | Japan | 3-111483 |
| May 17, 1991 | [JP] | Japan | 3-113244 |
| Aug. 30, 1991 | [JP] | Japan | 3-220108 |

[51] Int. Cl.$^6$ .............................................. G01C 19/72
[52] U.S. Cl. ................................................... 356/350
[58] Field of Search ................................ 356/350, 345

[56] References Cited

U.S. PATENT DOCUMENTS

| 4,765,739 | 8/1988 | Koizumi et al. |  |
| 5,018,859 | 5/1991 | Chang et al. | 356/350 |
| 5,037,205 | 8/1991 | Palath | 356/350 |
| 5,048,962 | 9/1991 | Kurokawa et al. |  |
| 5,116,127 | 5/1992 | Gröllmann | 356/350 |

FOREIGN PATENT DOCUMENTS

| 388929A1 | 9/1990 | European Pat. Off. . |
| 409375A1 | 1/1991 | European Pat. Off. . |
| 2187837 | 9/1987 | United Kingdom . |
| 89/10534 | 11/1989 | WIPO . |
| 90/08941 | 8/1990 | WIPO . |

OTHER PUBLICATIONS

*Fiber-Optic Gyros: 10th Anniversary Conference (1986)*, vol. 719, pp. 101–112, 1986.
"Progress in Fiber Optic Gyro Development", C. M. Ferrar, *ISA Transactions*, pp. 41–49, vol. 28, No. 2, 1989.

*Primary Examiner*—Samuel A. Turner
*Attorney, Agent, or Firm*—Merchant, Gould, Smith, Edell, Welter & Schmidt

[57] ABSTRACT

An optical gyro includes an optical propagation path, an optical system for giving a phase modulation and a serrodyne modulation by means of an analog sawtooth waveform signal, a unit for processing a photoelectric output signal from the optical system to thereby output a digital error data corresponding to a phase difference of light between light beams propagated in opposite directions, a unit for digitally setting a frequency of the sawtooth waveform signal for serrodyne modulation based on the error data, and a unit for generating the analog sawtooth waveform signal based on the digitally set frequency data. By changing the frequency of the sawtooth waveform signal for serrodyne modulation to thereby control the digital error data to be a value corresponding to the phase difference of light, it is possible to expand a maximum detectable range of an input rotation angular velocity and thereby obtain a gyro output or an angular increment output in a wide dynamic range.

25 Claims, 20 Drawing Sheets

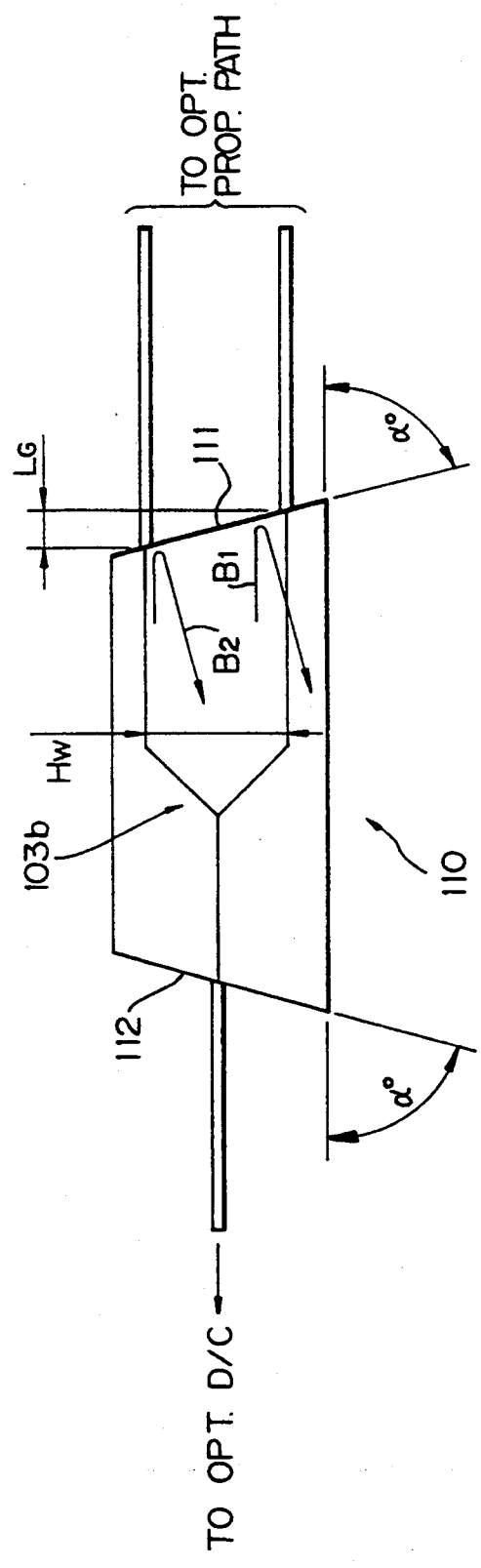
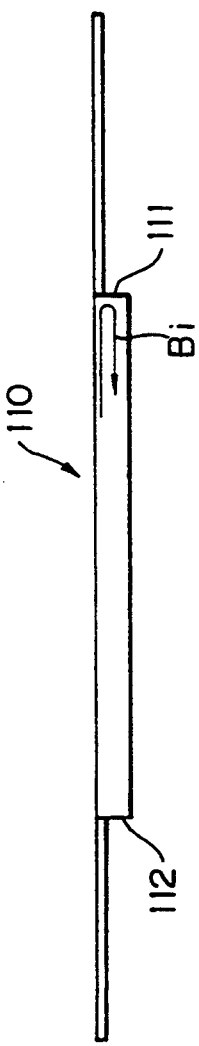
Fig. 18A
Fig. 18B

OPTICAL GYRO WITH EXPANDED DETECTABLE RANGE OF INPUT ROTATION ANGULAR VELOCITY AND OPTICAL WAVEGUIDE-TYPE PHASE MODULATOR USED IN THE SAME

BACKGROUND OF THE INVENTION

1. Field of the Invention

The present invention relates to an optical gyro for use in a detection of a rotational angular velocity. More particularly, it relates to a closed loop type fiber optical gyro using a serrodyne modulation and having a wide dynamic range of the detection, and an optical waveguide type phase modulator used in the fiber optical gyro.

2. Description of the Related Art

A typical fiber optical gyro using a serrodyne modulation includes a propagation path of an optical fiber through which light is propagated simultaneously clockwise and counterclockwise, an optical system optically coupled to the optical propagation path and having a serrodyne modulator for giving a serrodyne modulation to the propagated light, and a signal processing system for effecting an analog demodulation of a photoelectric output signal obtained from the optical system and thus driving the serrodyne modulator. In a known example, the signal processing system includes a unit for setting a frequency of a sawtooth waveform (or ramp waveform) signal for driving the serrodyne modulator, and a unit for generating the sawtooth waveform signal by means of an analog processing.

As described later in detail, however, the signal processing technique employing such an analog processing has a number of drawbacks. For example, since the sawtooth waveform signal is generated by means of the analog processing, a problem occurs in that a variable range of frequency of the sawtooth waveform signal is limited and thus a detectable range of the angular velocity of the gyro is limited to a narrow range. Another problem occurs in that an amplitude of the sawtooth waveform signal easily fluctuates due to a fluctuation in the temperature, or the like, and thus a linearity and scale factor stability of the gyro output are deteriorated.

Also, in a known optical waveguide type phase modulator used in an optical gyro, a problem occurs in that a bias fluctuation occurring due to light beams reflected from the end surface of the phase modulator is not negligible, as described later.

Note, the problems in the prior art will be explained later in detail in contrast with the preferred embodiments of the present invention.

SUMMARY OF THE INVENTION

A main object of the present invention is to provide an optical gyro which can expand a maximum detectable range of an input rotation angular velocity without changing a maximum frequency of a sawtooth waveform signal for serrodyne modulation or without changing over a frequency range with respect to a change in a frequency thereof, and thereby obtain a gyro output or an angular increment output in a wide dynamic range.

Another object of the present invention is to heighten a resolution of angular increment pulses as the gyro output and thus contribute to a highly precise detection of the rotational angular velocity.

Still another object of the present invention is to maintain a good linearity and scale factor stability of the gyro output even in a fluctuation in the temperature or the like.

Also, another object of the present invention is to provide an optical waveguide type phase modulator which is used in an optical gyro and can minimize a bias fluctuation due to a reflected light from an end surface at the joint to an optical propagation path.

According to one aspect of the present invention, there is provided an optical gyro comprising: an optical propagation path in cooperation with a rotation axis, for propagating a pair of light beams therethrough simultaneously clockwise and counterclockwise, respectively; an optical system, optically coupled to the optical propagation path, for giving a phase modulation by means of a signal of a constant frequency and a serrodyne modulation by means of an analog sawtooth waveform signal of a variable frequency to the light beams propagated in opposite directions, detecting coherent lights from the respective modulated light beams propagated in opposite directions, and outputting a photoelectric output signal corresponding to the coherent light intensity; a signal processing unit, operatively connected to the optical system, for taking components in synchronization with the signal of the constant frequency from the photoelectric output signal and thereby outputting a digital error data corresponding to a phase difference of light between the light beams propagated in opposite directions; a frequency setting unit, operatively connected to the signal processing unit, for digitally setting a frequency of the sawtooth waveform signal for serrodyne modulation based on the error data; and a sawtooth waveform signal generating unit, operatively connected between the frequency setting unit and the optical system, for generating the analog sawtooth waveform signal based on the digitally set frequency data, wherein the frequency of the sawtooth waveform signal for serrodyne modulation is changed to thereby control the digital error data to be a value corresponding to the phase difference of light.

Also, the optical gyro may further include a unit for generating gyro outputs.

According to another aspect of the present invention, there is provided an optical gyro comprising: an optical propagation path in cooperation with a rotation axis, for propagating a pair of light beams therethrough simultaneously clockwise and counterclockwise, respectively; an optical system, optically coupled to the optical propagation path, for giving a phase modulation by means of a signal of a constant frequency and a serrodyne modulation by means of an analog sawtooth waveform signal of a variable frequency to the light beams propagated in opposite directions, detecting coherent lights from the respective modulated light beams propagated in opposite directions, and outputting a photoelectric output signal corresponding to the coherent light intensity; a signal processing unit, operatively connected to the optical system, for taking components in synchronization with the signal of the constant frequency from the photoelectric output signal and thereby outputting a digital error data corresponding to a phase difference of light between the light beams propagated in opposite directions; a frequency setting unit, operatively connected to the signal processing unit, for digitally setting a frequency of the sawtooth waveform signal for serrodyne modulation based on the error data; and a sawtooth waveform signal generating unit, operatively connected between the frequency setting unit and the optical system, for generating the analog sawtooth waveform signal based on the digitally set frequency data, wherein the optical system includes: a first serrodyne modulator provided at one end of the optical propagation path; a second serrodyne modulator provided at the other end of the optical propagation path; and a unit for applying the analog sawtooth waveform signal to the first serrodyne modulator in a positive ramp and to the second serrodyne modulator in a negative ramp, respectively, and thereby driving the respective serrodyne modulators.

According to still another aspect of the present invention, there is provided an optical waveguide type phase modulator used in a fiber optical gyro in which light is propagated simultaneously clockwise and counterclockwise through an optical fiber coil in cooperation with a rotation axis and receives a phase modulation and thus a phase difference of light based on Sagnac effect is detected to thereby obtain an output indicating an angular velocity or angular increment, wherein the optical waveguide type phase modulator is formed integrally with an optical distributing and coupling unit jointed to an optical propagation path optically coupled to the optical fiber coil, and an end surface of the phase modulator at the joint to the optical propagation path is formed such that, when two light beams split by the optical distributing and coupling unit are emitted from the phase modulator toward the optical propagation path, an optical path difference is obtained between the two reflected beams from the end surface.

BRIEF DESCRIPTION OF THE DRAWINGS

Other objects and features of the present invention will be described hereinafter in detail by way of preferred embodiments with reference to the accompanying drawings, in which:

FIGS. 18A and 18B are a plan view and a side view, respectively, schematically illustrating a shape of the optical waveguide type phase modulator according to an embodiment of the present invention;

DESCRIPTION OF THE PREFERRED EMBODIMENTS

Throughout the description, identical references used in connection with the drawings indicate like constituent elements and thus the repetition of explanation thereof is omitted.

First, a first embodiment of the present invention will be explained with reference to FIGS. 1 to 3.

Before explaining the first embodiment, the related prior art will be explained with reference to FIG. 1.

Figure 1:
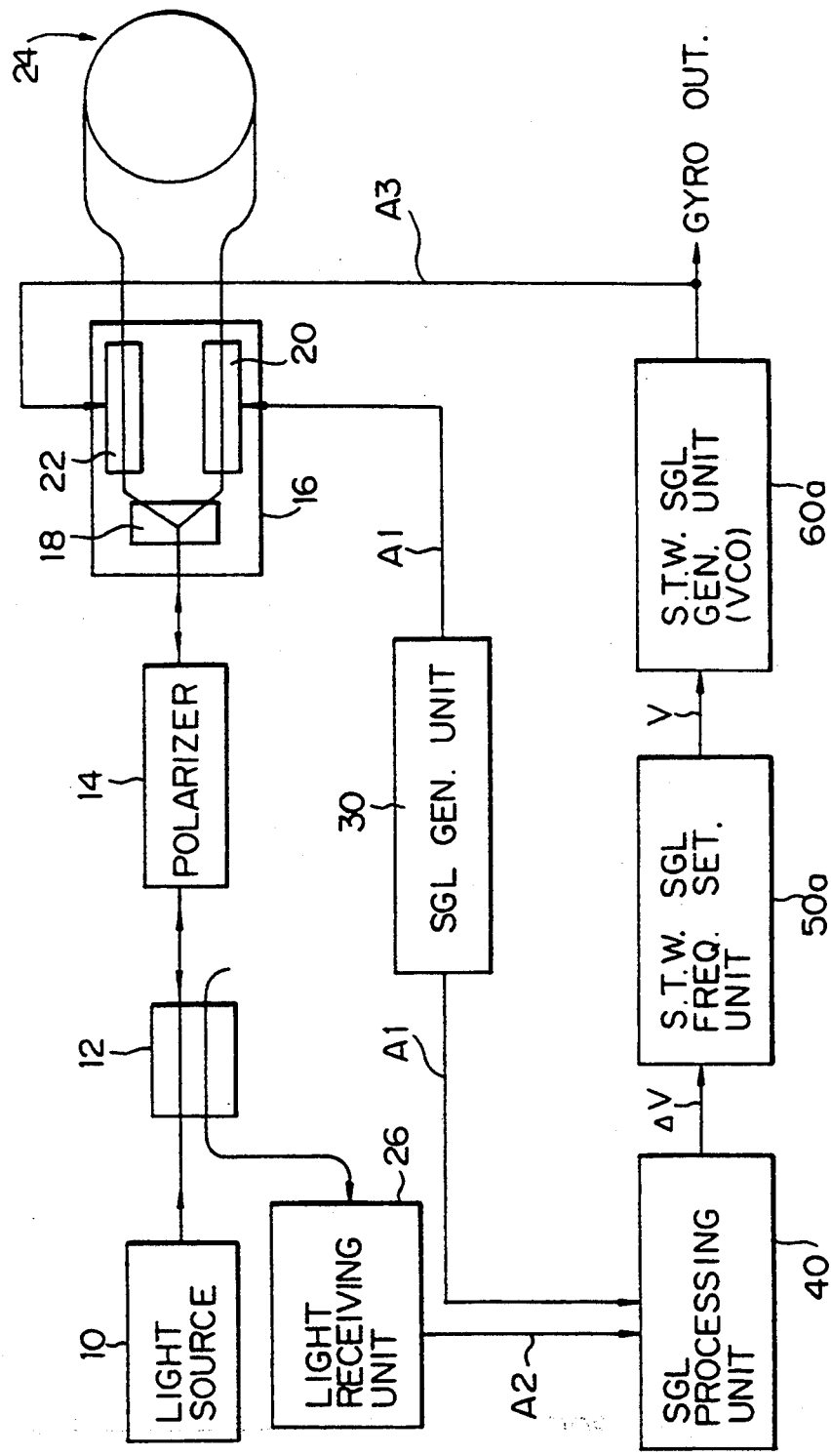
FIG. 1 is a block diagram illustrating, partially schematically, a constitution of a prior art fiber optical gyro using a serrodyne modulation.

FIG. 1 illustrates, partially schematically, a constitution of a prior art fiber optical gyro using a serrodyne modulation.

In the illustration, reference 10 denotes a light source; references 12, 18 each an optical distributor and coupler; reference 14 a polarizer; reference 16 a crystal substrate having an electro-optic effect; reference 20 a phase modulator; reference 22 a serrodyne modulator; reference 24 a loop formed by a single mode optical fiber wound perpendicularly with respect to a rotation axis and conserving the plane of polarization; reference 26 a light receiving unit including a photoelectric transducing circuit; reference 30 a signal generating unit; reference 40 a signal processing unit for the fiber optical gyro; reference 50a a unit for setting a frequency of a sawtooth waveform signal; reference 60a a unit for generating the sawtooth waveform signal by means of a voltage controlled oscillator (VCO); reference A1 a phase modulator drive signal; reference A2 a photoelectric output signal; and reference A3 a gyro output having a sawtooth waveform, i.e., a rotational angular velocity. The gyro output A3 is used as a serrodyne modulator drive signal.

Note, the optical distributor and coupler 18, the phase modulator 20 and the serrodyne modulator 22 are constituted by an optical waveguide formed by diffusing titanium (Ti) on the electro-optic crystal substrate 16 of, for example, lithium niobate (LiNbO₃), and means for applying a voltage across electrodes provided in the vicinity of the optical waveguide and changing a refractive index of the optical waveguide.

In the constitution of FIG. 1, a light beam emitted from the light source 10 is received at the optical distributor and coupler 12 and then split into two light beams. One of the light beams is received at the polarizer 14 and a portion thereof, i.e., only the polarized component, is transmitted through the polarizer 14. The polarized beam is received at the optical distributor and coupler 18 and then split into two light beams.

One of the two light beams is received at the phase modulator 20 and given a phase modulation of a constant frequency. The phase-modulated light beam is propagated counterclockwise through the optical fiber loop 24, then received at the serrodyne modulator 22 and given a serrodyne modulation by a sawtooth waveform signal. The serrodyne-modulated light beam is received at the optical distributor and coupler 18.

In the like manner, another of the two light beams is received at the serrodyne modulator 22 and given a serrodyne modulation. The serrodyne-modulated light beam is propagated clockwise through the optical fiber loop 24, then received at the phase modulator 20 and given a phase modulation. The phase-modulated light beam is received at the optical distributor and coupler 18.

Two light beams incident on the optical distributor and coupler 18 are coupled. The coupled light beam is received at the polarizer 14 and a portion thereof, i.e., only the polarized component, is transmitted through the polarizer 14. The polarized light beam is received at the optical distributor and coupler 12 and then split into two light beams. One of the two light beams is received at the light receiving unit 26 and then transduced into the photoelectric output signal A2. The signal A2 corresponds to a coherent light intensity dependent on a phase difference between the two light beams which have been propagated through the optical fiber loop 24 in the opposite direction.

The phase modulator 20 is driven by the signal A1 having a sinusoidal or square waveform of a constant frequency generated from the signal generating unit 30. The phase modulator drive signal A1 is also input to the signal processing unit 40. The signal processing unit 40 responds to the signal A1 from the signal generating unit 30 and detects the photoelectric output signal A2 from the light receiving unit 26 at every constant frequency. An output $\Delta V$ of the signal processing unit 40 is expressed by the following formula:

$$\Delta V = K \cdot \sin \Delta \phi \quad (1)$$

Note, $\Delta\phi$ indicates a phase difference between the above two light beams and K indicates a constant. The frequency setting unit 50a has a function of integrating the output $\Delta V$ expressed by the formula (1). The sawtooth waveform signal generating unit 60a generates the analog sawtooth waveform signal A3 (rotational angular velocity output) having a frequency corresponding to the magnitude of an output V of the frequency setting unit 50a.

The phase difference $\Delta\phi$ is the sum of a phase difference $\phi s$ of light based on Sagnac effect occurring when the optical fiber loop 24 receives a given angular velocity in the circumferential direction of the rotation axis perpendicular to the loop, and a phase difference $\phi m$ induced by the serrodyne modulator 22. The phase difference $\phi s$ is expressed by the following formula:

$$\phi s = 4\pi R\, L\Omega/C\lambda \quad (2)$$

Also, under a condition that the amplitude of a phase quantity by the sawtooth waveform signal is $2\pi$, the phase difference $\phi m$ is expressed by the following formula:

$$\phi m = 2\pi\tau/T\,m = 2\pi n\, L f m/C \quad (3)$$

Note, R indicates a radius of the optical fiber loop 24; L a length of the optical fiber forming the optical fiber loop 24; $\Omega$ an input rotation angular velocity; C a speed of light in a vacuum atmosphere; $\lambda$ a wavelength of light in the vacuum atmosphere; $\tau$ a time required for propagating the light through the optical fiber loop 24; T m a cycle or period of the sawtooth waveform signal A3; n a refractive index of the optical fiber; and f m a frequency of the sawtooth waveform signal A3.

Where the input rotation angular velocity $\Omega$ is changed, the above serrodyne modulation fiber optical gyro functions such that it integrates the output a $\Delta V$ of the signal processing unit 40 by means of the frequency setting unit 50a, applies the integrated output to the sawtooth waveform signal generating unit 60a in the form of a negative feedback, and thereby controls the phase difference a $\Delta\phi$ (i.e., output $\Delta V$ of the unit 40) to be continually kept to a predetermined value (normally zero "0"). Assuming that the phase difference $\Delta\phi$ ($=\phi s+\phi m$) is equal to zero, the relationship below is induced from the formulas (2) and (3).

$$\Omega = n\lambda f m/2R \quad (4)$$

From the formula (4), it will be appreciated that, by measuring the frequency of the sawtooth waveform signal, it is possible to detect the input rotation angular velocity in a wide dynamic range.

Also, considering the gyro output as a train of pulse signals having the same frequency as that of the sawtooth waveform signal A3, the gyro output constitutes an angular increment pulse output, each pulse having a constant angle $\Delta\theta$ as a weight. Note, from the formula (4), $\Delta\theta$ is expressed as follows:

$$\Delta\theta = \Omega/f m = n\lambda/2R \quad (5)$$

In the above prior art closed loop type fiber optical gyro using a serrodyne modulation, the sawtooth waveform signal A3 to be applied to the serrodyne modulator 22 is generated by the sawtooth waveform signal generating unit 60a which carries out an analog operation by means of the voltage controlled oscillator (VCO). This results in a problem in that a variable range of the frequency of the analog signal A3 to be generated is limited. Namely, since a maximum detectable range of the angular velocity of the gyro is dependent on a maximum frequency of the sawtooth waveform signal A3, a disadvantage occurs in that the maximum frequency must be increased for the purpose of an expansion of the maximum detectable range. This leads to a modification in design of the sawtooth waveform signal generating unit 60a per se and thus is not preferable.

As an example, to obtain a wide dynamic range covering the order of $10^6$ which is often demanded, there can be proposed an approach in which a plurality of sawtooth waveform signal generating units, each having a different range of frequency, are provided and switched to one another. This, however, results in a problem in that a discontinuity occurs at the boundary of the respective ranges of two units and thus the control to modify the discontinuity is very cumbersome.

Also, another problem occurs in that an amplitude of the sawtooth waveform signal easily fluctuates due to a fluctuation in the temperature, or the like, and thus a linearity and scale factor stability of the gyro output are deteriorated.

Furthermore, since a minimum resolution of the angular increment pulse in the measurement of the frequency of the gyro output (A3) is determined by the radius of the optical fiber loop 24, the wavelength of light and the refractive index of the optical fiber, a disadvantage occurs in that a detectable range of frequency of the gyro output (i.e., rotational angular velocity) is limited. This is not preferable from a viewpoint of a precise detection of the rotational angular velocity.

Figure 2:
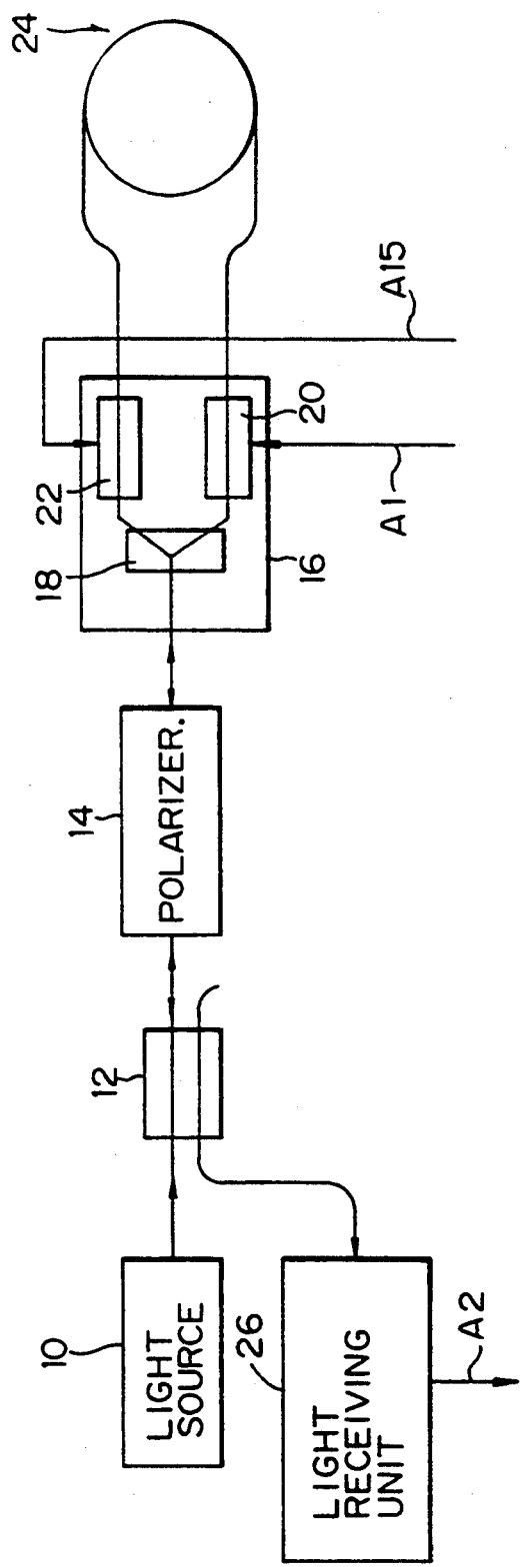
FIG. 2 is a block diagram illustrating, partially schematically, a constitution of the optical system applied to each embodiment of the present invention.
Figure 3:
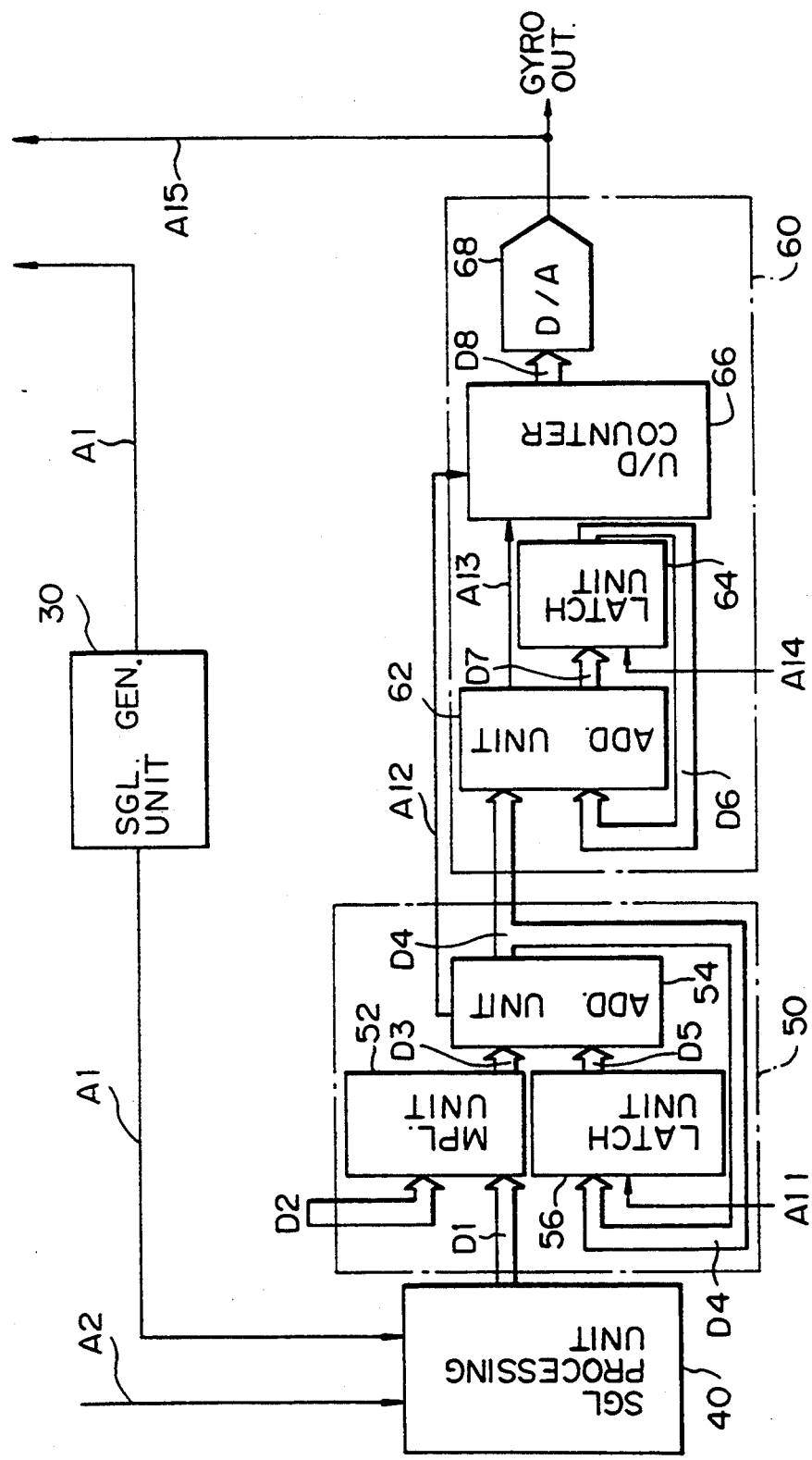
FIG. 3 is a block diagram illustrating a constitution of the main parts of the serrodyne modulation fiber optical gyro according to a first embodiment of the present invention.

FIGS. 2 and 3 illustrate a constitution of the serrodyne modulation fiber optical gyro according to the first embodiment of the present invention.

Note, the optical system shown in FIG. 2 and the signal generating unit 30 and the signal processing unit 40 shown in FIG. 3 are the same as those in FIG. 1, and thus the explanation thereof is omitted.

In FIG. 3, reference 50 denotes a unit for setting a frequency of a sawtooth waveform signal for the serrodyne modulation (i.e., frequency setting unit), and reference 60 denotes a unit for generating the sawtooth waveform signal by means of a direct digital synthesizing processing (i.e., sawtooth waveform signal generating unit).

The frequency setting unit 50 includes a digital multiplication unit 52 responsive to a digital error data D1 output from the signal processing unit 40 and a digital data D2 indicating a coefficient for determining a feedback loop gain, an addition unit 54 for adding an output data D3 of the digital multiplication unit 52 to a previous last set frequency data D5 of the sawtooth waveform signal, and a latch unit 56, responsive to an external clock signal A11, for latching a newly set frequency data D4 output from the addition unit 54.

Also, the sawtooth waveform signal generating unit 60 includes an addition unit 62 for adding the set frequency data D4 output from the frequency setting unit 50 to a previous last added data D6, a latch unit 64, responsive to an external clock signal A14, for latching a newly added data D7 output from the addition unit 62, an up/down counter 66, responsive to an up/down switching signal A12 output from the addition unit 54, for counting a carry (carry signal A13) produced by an overflow of the addition unit 62, and a digital to analog (D/A) converter 68 for converting a digital sawtooth waveform signal D8 output from the up/down counter 66 into an analog sawtooth waveform signal A15. The analog sawtooth waveform signal A15 indicates a gyro output, i.e., a rotational angular velocity output, and is used as a drive signal for the serrodyne modulator 22.

In the fiber optical gyro thus constituted, an output of the light receiving unit 26 (photoelectric output signal A2) corresponding to a coherent light intensity is digitally demodulated by the signal processing unit 40 and thus only a component in synchronization with a fundamental wave component of the output signal A1 of the signal generating unit 30 is detected. The detected component is input to the frequency setting unit 50 as the digital error data D1.

In the frequency setting unit 50, the digital multiplication unit 52 multiplies the error data D1 by the coefficient (D2) indicating the feedback loop gain to thereby output the digital control value D3. The addition unit 54 adds the digital control value D3 to the previous last set frequency data D5 to thereby output the newly set frequency data D4. The latch unit 56 synchronizes with the external clock signal A11 to thereby latch the newly set frequency data D4 during a time corresponding to one clock and, at the same time, outputs the previous last set frequency data D5 to the addition unit 54. The newly set frequency data D4 thus generated is input to the sawtooth waveform signal generating unit 60 using a direct digital synthesizing processing.

In the sawtooth waveform signal generating unit 60, the addition unit 62 adds the newly set frequency data D4 to the previous last added data D6 to thereby output the newly added data D7. The addition unit 62 also outputs the carry signal A13 where the computed result causes an overflow to thereby produce a carry. The latch unit 64 synchronizes with the external clock signal A14 to thereby latch the newly added data D7 during a time corresponding to one clock and, at the same time, outputs the previous last added data D6 to the addition unit 62. The up/down counter 66 responds to the up/down switching signal A12 indicating a sign of the newly set frequency data D4, counts the number of the carry signal A13 by an incremental or decremental operation and, based on the counted value, outputs the digital sawtooth waveform signal D8. The D/A converter 68 converts the digital sawtooth waveform signal D8 into the analog sawtooth waveform signal A15. The analog sawtooth waveform signal A15 is input to the serrodyne modulator 22 as the drive signal for the serrodyne modulation.

According to the constitution of the present embodiment, by setting the respective number of bit of the set frequency data D4,D5 and the added data D6,D7 to a greater number, it is possible to obtain the carry signal A13 at a longer cycle as the value of the set frequency data D4 becomes smaller, and at a shorter cycle as it becomes larger. Accordingly, by counting the number of the carry signal A13 by the incremental or decremental operation of the up/down counter 66 and then converting the counted value (digital signal D8) via the D/A converter 68 into the corresponding analog signal, it is possible to generate the sawtooth waveform signal A15 at various cycles covering from a short cycle to a long cycle.

As a result, is possible to carry out the serrodyne modulation in a wide range of frequency and thus expand a maximum detectable range of an input rotation angular velocity.

Also, the time required for the frequency conversion is dependent on the clock signal A11 for the latch unit 56 and the clock signal A14 for the latch unit 64. Accordingly, by using the clock signals A11,A14 at a higher frequency, it is possible to change the frequency or cycle of the analog sawtooth waveform signal A15 at a high speed and thus expand the output frequency characteristics of the fiber optical gyro to a higher frequency region. As a result, it is possible to maintain a good linearity and scale factor stability of the gyro output even when the frequency of the sawtooth waveform signal A15 is changed due to a fluctuation in the temperature or the like.

Although, in the above first embodiment, the sawtooth waveform signal A15 used as the serrodyne modulation drive signal is taken out as the gyro output, the gyro output can be taken out in other forms.

Figure 4:
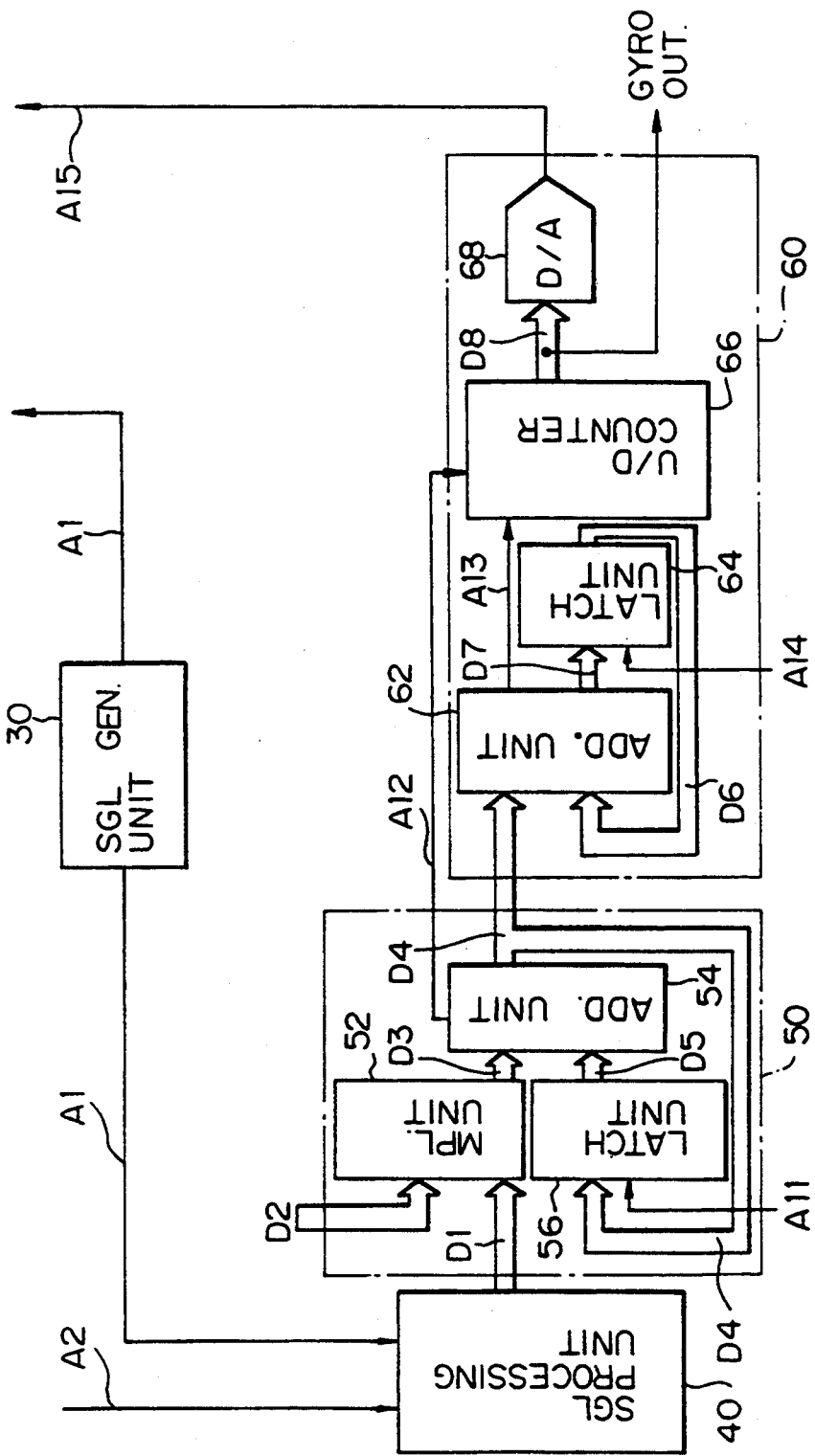
FIG. 4 is a block diagram illustrating a first modification of the embodiment of FIG. 3.

FIG. 4 illustrates a first modification of the embodiment of FIG. 3.

In the present example, a portion of the output of the up/down counter 66, i.e., the digital sawtooth waveform signal D8 is used as the gyro output (rotational angular velocity output).

In this case, the frequency of a bit having the greatest weight among the digital sawtooth waveform signal D8, i.e., most significant bit (MSB), is the same as the frequency f m of the analog sawtooth waveform signal A15, and the frequency of a bit having the second greatest weight, i.e., (MSB-1), becomes $m_1$ times the frequency f m of the signal A15 Note $m_1$ indicates a natural number and is greater than one $m_1 > 1$). In general, the frequency of each bit among the digital sawtooth waveform signal D8 becomes $m_K$ times the frequency f m of the signal A15. Note, "k" corresponds to the respective bit and $m_K$ is greater than one ($m_K > 1$).

Therefore, by selecting an arbitrary one bit from among the digital sawtooth waveform signal D8 and taking out the selected bit as the gyro output, a weight of the angular increment pulse as the gyro output is expressed from the formula (5) as follows:

$$\Delta\theta = \Omega/(m_K \cdot f m) = n\lambda/(m_K \cdot 2R) \tag{6}$$

Namely, compared with the case in that the frequency of the analog sawtooth waveform signal A15 is used as the gyro output, it is possible to reduce the weight per pulse of the angular increment pulse to $1/m_K$ times. As a result, it is possible to heighten a minimum resolution of the angular increment pulse in the measurement of the frequency of the gyro output.

In the present embodiment, the up/down counter 66 in the sawtooth waveform signal generating unit 60 is constituted by a binary counter. Accordingly, the digital sawtooth waveform signal D8 is a binary data. In this case, the frequency of the bit (MSB) among the digital sawtooth waveform signal D8 is the same as the frequency f m of the analog sawtooth waveform signal A15, and the frequency of the bit (MSB-1) becomes twice that of the signal A15. In general, the frequency of an arbitrary bit (MSB-m) becomes $2^m$ times that of the signal A15. Therefore, by using the arbitrary bit (MSB-m) as the gyro output, the weight of the angular increment pulse is reduced to $\frac{1}{2}^m$ times as is obvious from the formula (6). This contributes to an increase in the minimum resolution.

Figure 5:
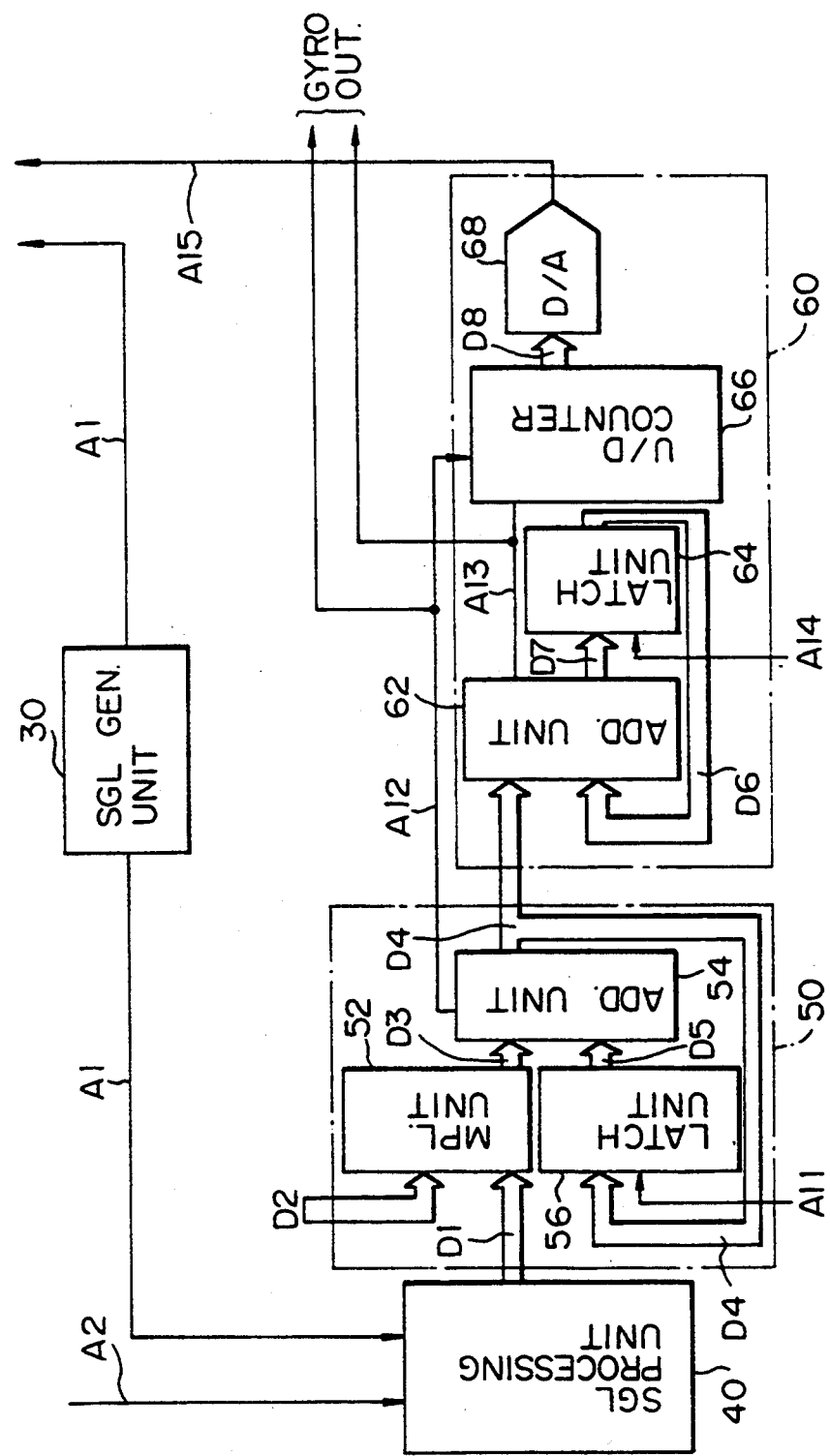
FIG. 5 is a block diagram illustrating a second modification of the embodiment of FIG. 3.

FIG. 5 illustrates a second modification of the embodiment of FIG. 3.

In the present example, the up/down switching signal A12 output from the addition unit 54 of the frequency setting unit 50 and the carry signal A13 output from the addition unit 62 of the sawtooth waveform signal generating unit 60 are used as the gyro output (rotational angular velocity output).

Note, the up/down switching signal A12 indicates the sign of the sawtooth waveform signal (i.e., positive ramp or negative ramp) and the carry signal A13 indicates the frequency thereof. In the like manner as the embodiment of FIG. 4, the frequency of the gyro output can be heightened to $2^m$ times that of the analog sawtooth waveform signal A15 by constituting the up/down counter 66 by means of a binary counter of m bits.

Figure 6:
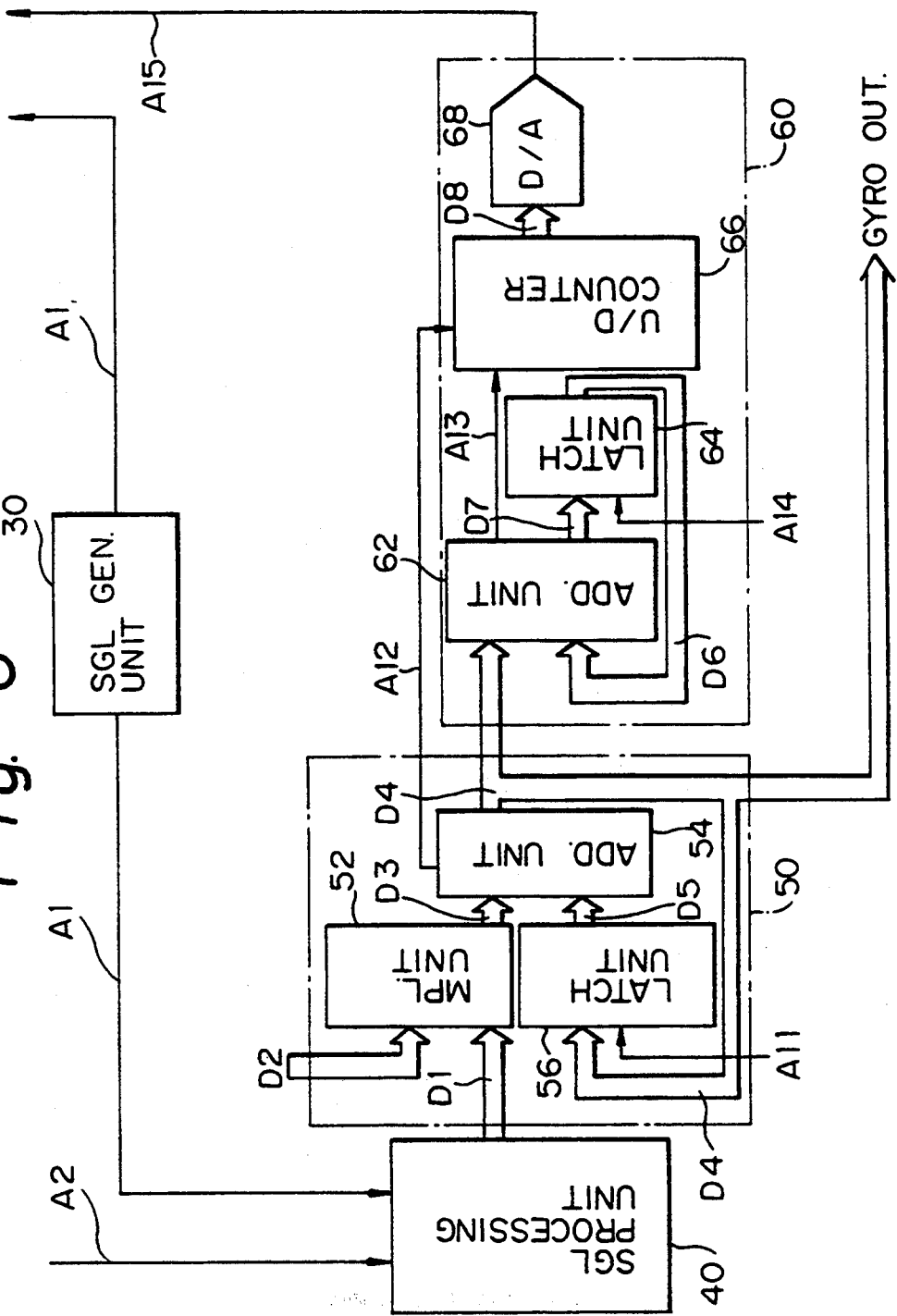
FIG. 6 is a block diagram illustrating a third modification of the embodiment of FIG. 3.

FIG. 6 illustrates a third modification of the embodiment of FIG. 3.

In the present example, the digital frequency data D4 output from the frequency setting unit 50 is used as the gyro output (rotational angular velocity output).

In this case, since the set frequency data D4 indicates a frequency (i.e., angular velocity) of the sawtooth waveform signal, it is possible to obtain the corresponding angular increment output by integrating the frequency data D4 for a constant time. At this time, the minimum resolution $\Delta\theta'$ is expressed as follows:

$$\Delta\theta' = \Omega_{MAX}/N/f_{CA} \tag{7}$$

Note, $\Omega_{MAX}$ indicates a maximum input rotation angular velocity; N a maximum value of the set frequency data of the sawtooth waveform signal; and $f_{CA}$ a frequency of a first clock.

By the way, the minimum resolution $\Delta\theta$ in the prior art is expressed from the formula (5) as follows:

$$\begin{aligned}\Delta\theta &= \Omega_{MAX}/f_{MAX} \\ &= \Omega_{MAX}/(1/2^m)/f_{CB}\end{aligned} \tag{8}$$

Therefore, by selecting the value of N to be greater than $(\frac{1}{2}^m) \cdot (f_{CB}/f_{CA})$, it is possible to heighten the minimum resolution in the present embodiment. Note, $f_{MAX}$ indicates a maximum frequency of the analog sawtooth waveform signal; m the number of bit in the up/down counter 66 as a binary counter; and $f_{CB}$ a frequency of a second clock.

Next, a second embodiment of the present invention will be explained with reference to FIGS. 7 to 14.

Figure 7:
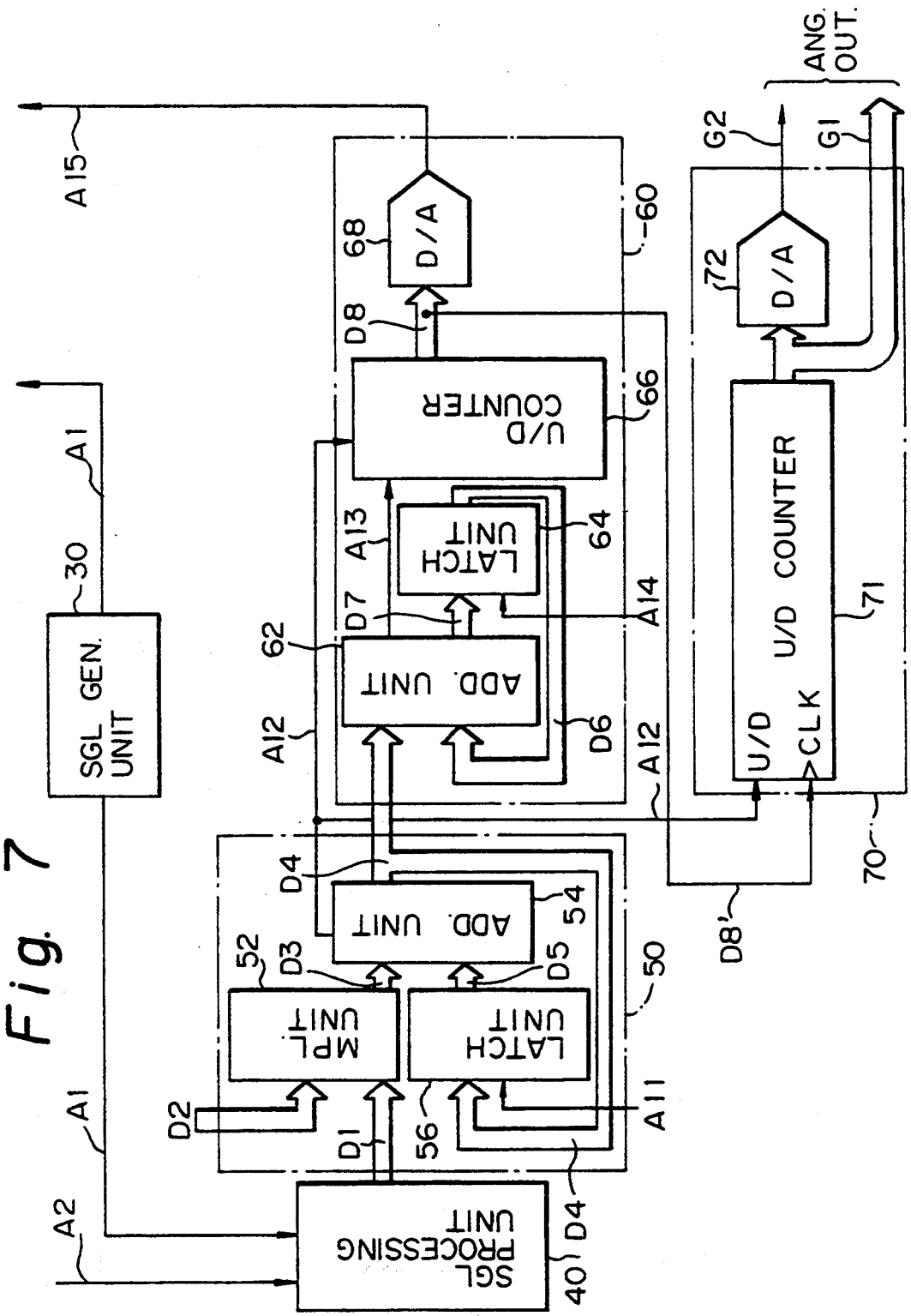
FIG. 7 is a block diagram illustrating a constitution of the main parts of the serrodyne modulation fiber optical gyro according to a second embodiment of the present invention.

FIG. 7 illustrates a constitution of the main parts of the serrodyne modulation fiber optical gyro according to the second embodiment The illustrated constitution is intended to solve the problems posed by the prior art fiber optical gyro shown in FIG. 1 and can be connected to the optical system shown in FIG. 2. Also, the illustrated constitution and the operation thereof are the same as those of the first embodiment in FIG. 3, except that a gyro output generating circuit 70 is additionally provided, and thus the explanation thereof is omitted.

In the present embodiment, the gyro output generating circuit 70 includes an up/down counter 71, responsive to the up/down switching signal A12, for counting an arbitrary one bit D8' among the digital sawtooth waveform signal D8 and outputting the counted result as a first gyro output (digital angle output G1), and a D/A converter 72 for converting the output of the counter 71 into an analog signal to thereby generate a second gyro output (analog angle output G2).

According to the constitution of the second embodiment, it is possible to obtain not only the advantages obtained by the embodiment of FIG. 3 but also the advantages described below.

Namely, since the arbitrary bit D8' among the digital sawtooth waveform signal D8 is changed with a frequency corresponding to the input rotation angular velocity, one cycle thereof indicates an angular increment as shown by the formula (5). Accordingly, by supplying the up/down counter 71 with the arbitrary bit D8' of the signal D8 together with the up/down switching signal A12 which indicates the sign of the digital data D8, it is possible to obtain the digital angle output G1. This digital angle output G1 can be utilized in a host computer for navigation computation. Also, by converting the output of the counter 71 (digital angle output G1) via the D/A converter 72 into the corresponding analog signal, it is possible to obtain the analog angle output G2. This analog angle output G2 can be utilized for a control of a servomotor or the like.

Additionally, although an output obtained from an ordinary digital signal processing apparatus is in the form of a discontinuity during renewal of data, it is possible to obtain a continuous angle output by a first-order interpolation according to the present embodiment.

Figure 8:
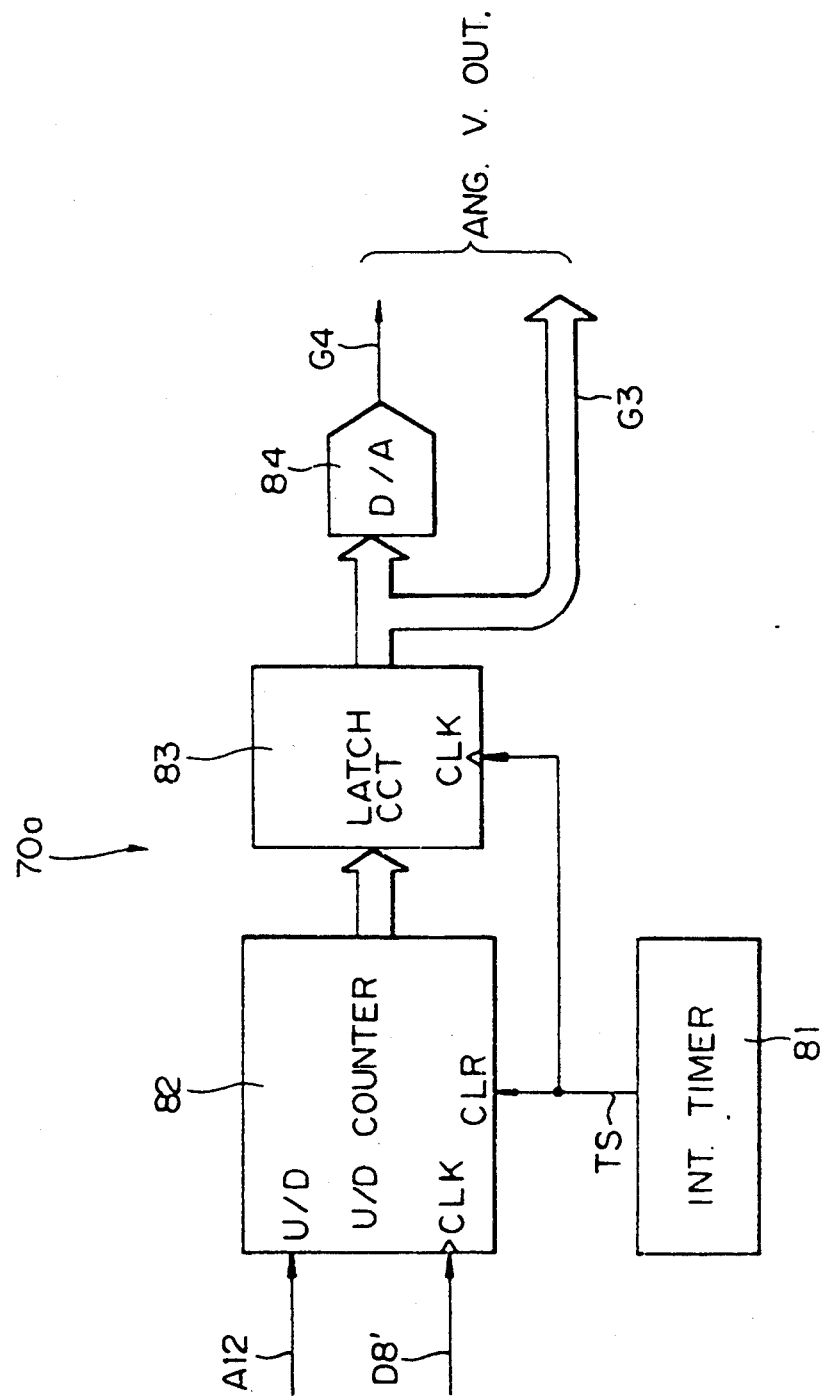
FIG. 8 is a block diagram illustrating a modification of the gyro output generating circuit shown in FIG. 7.

FIG. 8 illustrates a modification (70a) of the gyro output generating circuit 70 shown in FIG. 7.

The illustrated gyro output generating circuit 70a includes an interval timer 81 for generating a timing signal TS at an arbitrary time interval, an up/down counter 82, responsive to the up/down switching signal A12, for counting the arbitrary one bit D8' among the digital sawtooth waveform signal D8 and clearing the counted value in response to the timing signal TS, a latch circuit 83, responsive to the timing signal TS, for latching the output of the counter 82 and outputting the latched result as a third gyro output (digital angular velocity output G3), and a D/A converter 84 for converting the output of the latch circuit 83 into an analog signal to thereby generate a fourth gyro output (analog angular velocity output G4).

Although the arbitrary bit D8' among the digital sawtooth waveform signal D8 is changed with a frequency corresponding to the input rotation angular velocity, the response thereof is dependent on the clock signal A11 in the frequency setting unit 50. In this case, since the output frequency of the bit D8' is constant in a duration between clocks, it is possible to obtain an output having an angular increment averaged in time.

Accordingly, by clearing the output of the counter 82 to zero (0) at the arbitrary interval in response to the timing signal TS from the interval timer 81, it is possible to obtain an output averaged between the intervals, i.e., the digital angular velocity output G3. This digital angular velocity output G3 can be utilized in a host computer for navigation computation. Also, by converting the digital angular velocity output G3 via the D/A converter 84 into the corresponding analog signal, it is possible to obtain the analog angular velocity output G4.

Figure 9:
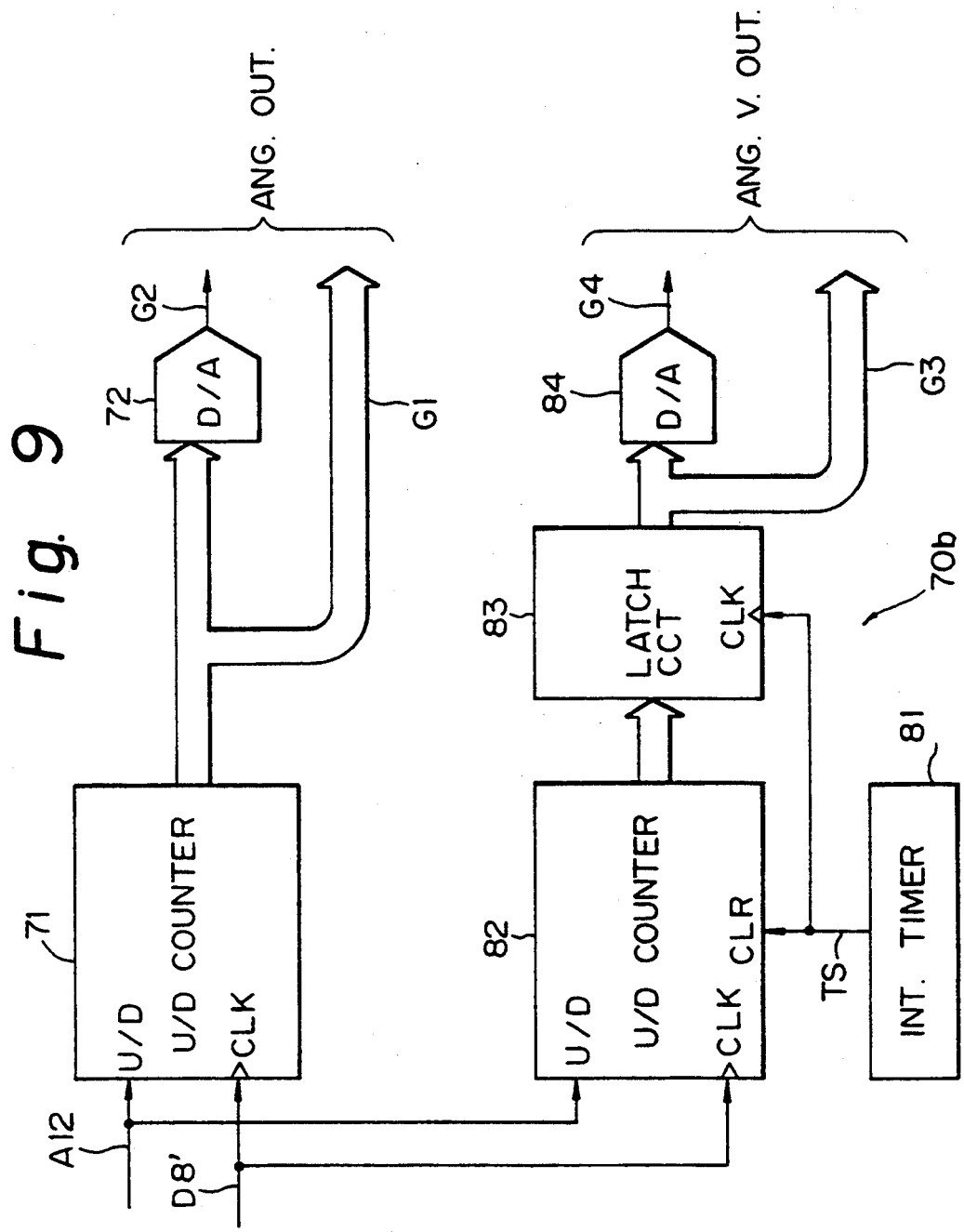
FIG. 9 is a block diagram illustrating another modification of the gyro output generating circuit shown in FIG. 7.

FIG. 9 illustrates another modification (70b) of the gyro output generating circuit 70 shown in FIG. 7.

The illustrated gyro output generating circuit 70b is a combination of the gyro output generating circuit 70 of FIG. 7 and the gyro output generating circuit 70a of FIG. 8, and obtains both the angle outputs G1,G2 and the angular velocity outputs G3,G4 by means of two up/down counters 71 and 82.

Figure 10:
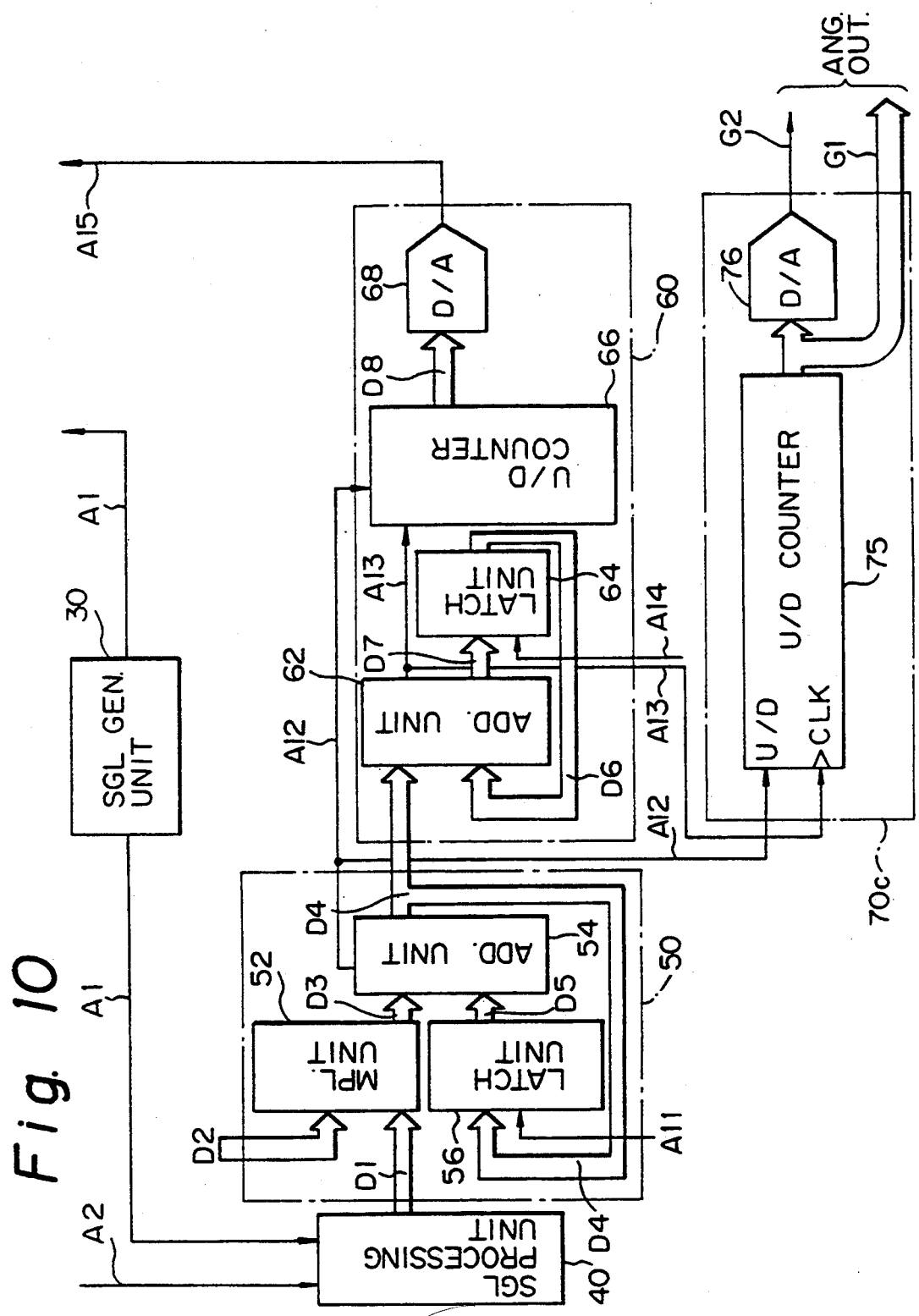
FIG. 10 is a block diagram illustrating a first modification of the embodiment of FIG. 7.

FIG. 10 illustrates a first modification of the embodiment of FIG. 7.

The illustrated constitution and the operation thereof are the same as those of the embodiment in FIG. 7, except that a gyro output generating circuit 70c is substituted for the gyro output generating circuit 70 of FIG. 7, and thus the explanation thereof is omitted.

In the present embodiment, the gyro output generating circuit 70c responds to the carry signal A13 in place of the arbitrary bit D8' among the digital sawtooth waveform signal D8. In this case, since the carry signal A13 is changed with a frequency corresponding to the input rotation angular velocity, one cycle thereof indicates an angular increment as shown by the formula (5).

Accordingly, by supplying an up/down counter 75 with the carry signal A13 together with the up/down switching signal A12, it is possible to obtain the digital angle output G1. Also, by converting the output of the counter 75 (digital angle output G1) via a D/A converter 76 into the corresponding analog signal, it is possible to obtain the analog angle output G2. Furthermore, in the same manner as in FIG. 7, it is possible to obtain a continuous angle output by a first-order interpolation.

Figure 11:
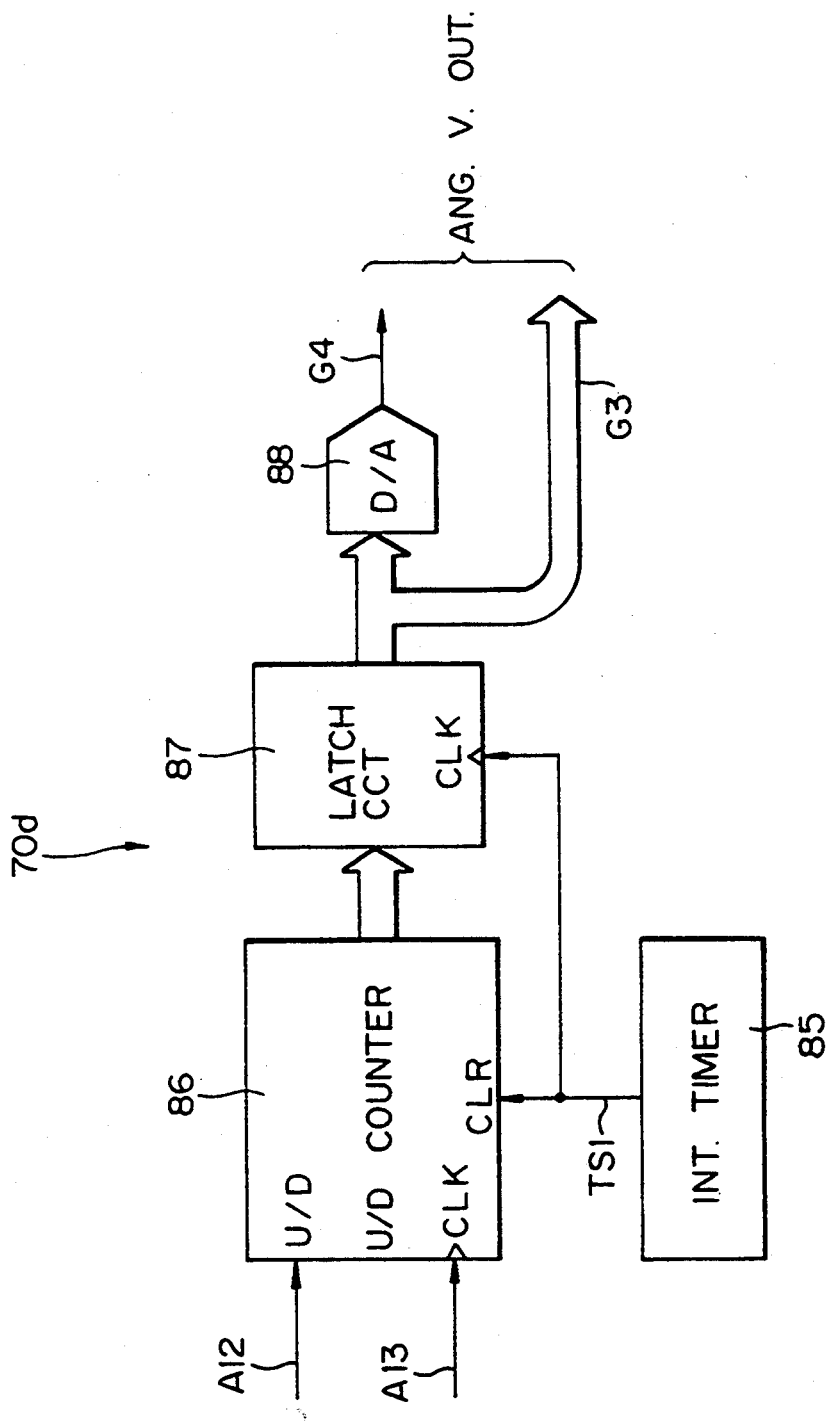
FIG. 11 is a block diagram illustrating a modification of the gyro output generating circuit shown in FIG. 10.
Figure 12:
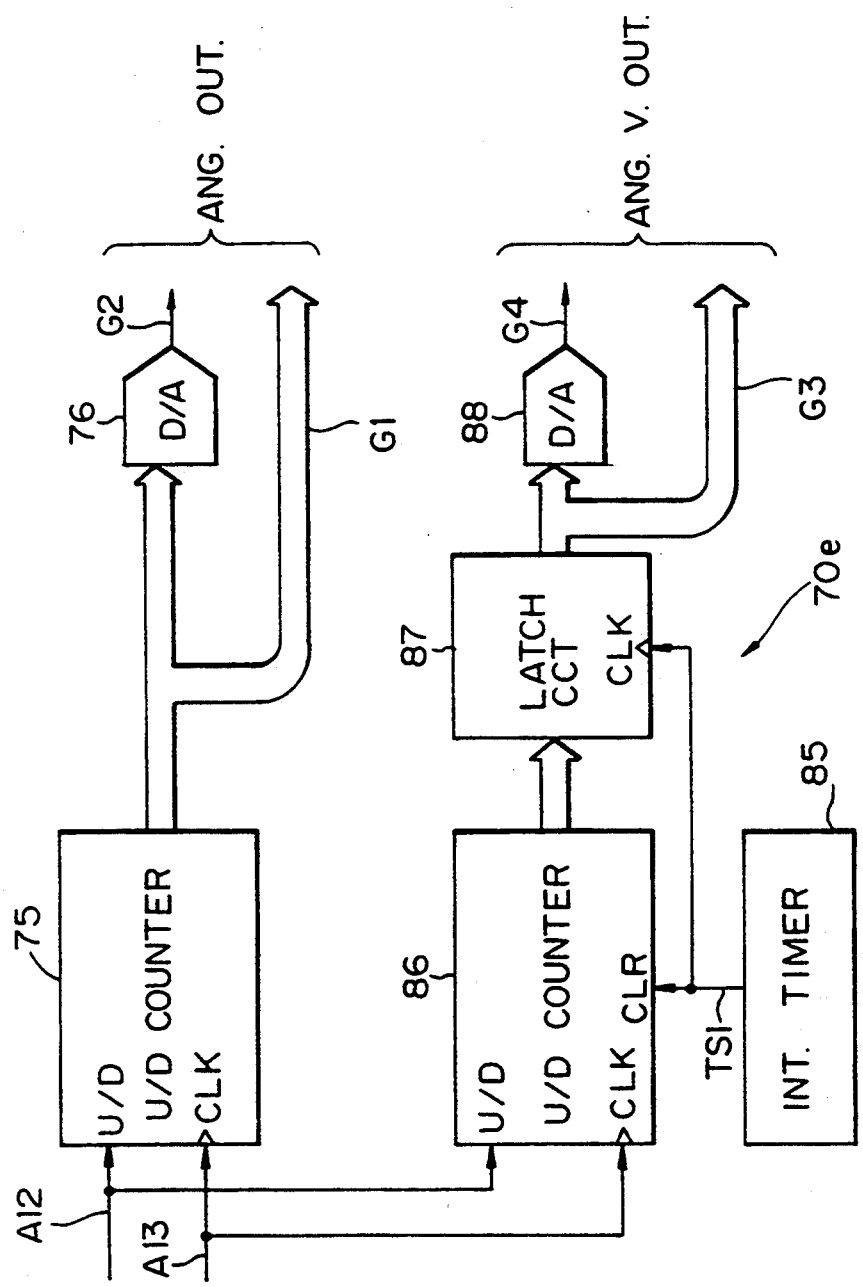
FIG. 12 is a block diagram illustrating another modification of the gyro output generating circuit shown in FIG. 10.

FIGS. 11 and 12 illustrate modifications (70d,70e) of the gyro output generating circuit 70c shown in FIG. 10, respectively.

The modifications 70d,70e are constituted by the like circuit constitutions as those in FIGS. 8 and 9, respectively, and thus the explanations on the operation thereof and the resulting effect are omitted.

Figure 13:
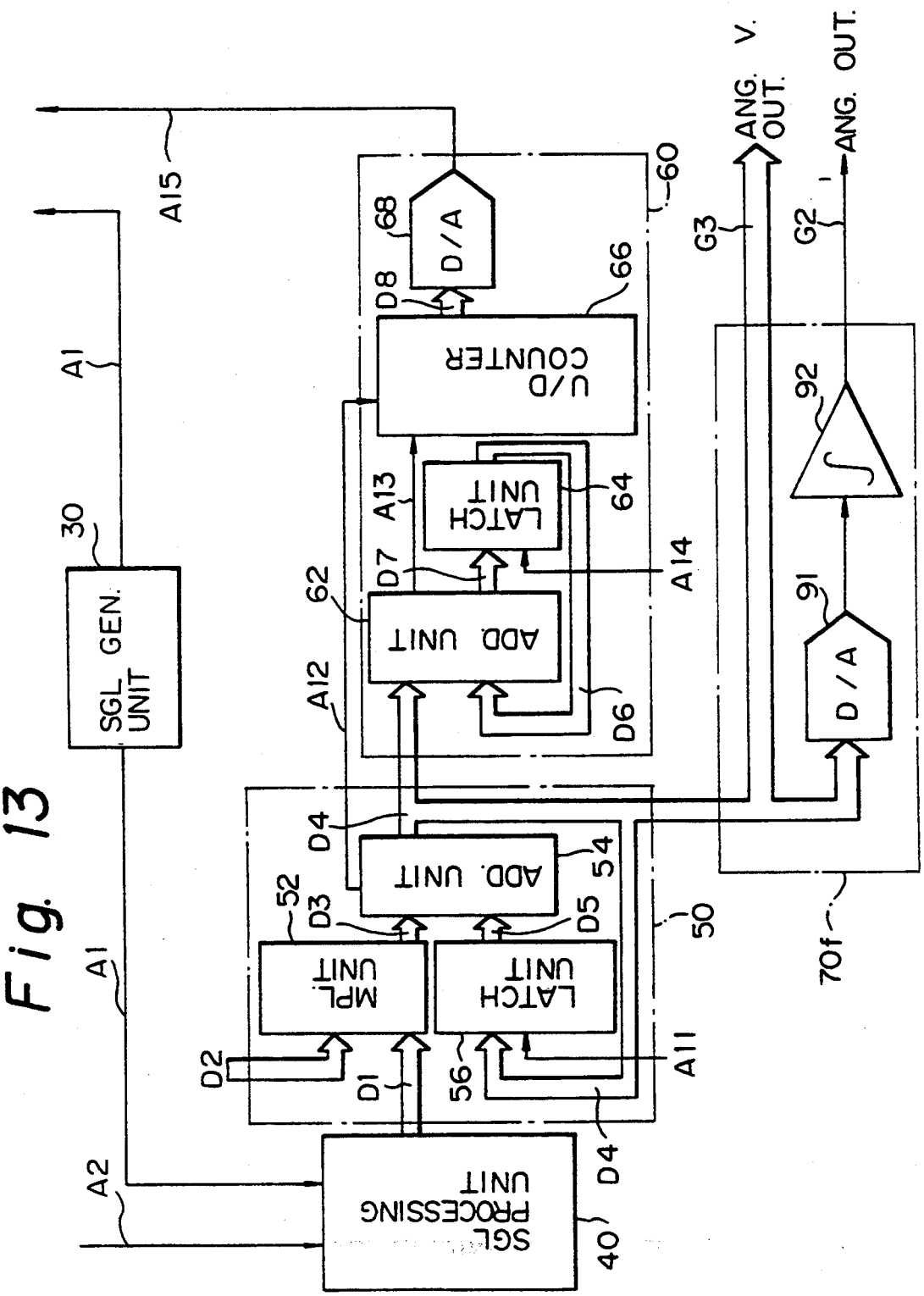
FIG. 13 is a block diagram illustrating a second modification of the embodiment of FIG. 7.

FIG. 13 illustrates a second modification of the embodiment of FIG. 7.

The illustrated constitution and the operation thereof are the same as those of the embodiment in FIG. 7, except that a gyro output generating circuit 70f is substituted for the gyro output generating circuit 70 of FIG. 7, and thus the explanation thereof is omitted.

In the present embodiment, the gyro output generating circuit 70f includes a D/A converter 91 for converting the digital frequency data D4 output from the frequency setting unit 50 into a corresponding analog signal, and an integrator 92 for integrating the output of the D/A converter 91 and outputting the integrated result as a gyro output (analog angle output G2).

In this case, since the digital frequency data D4 indicates the input rotation angular velocity, i.e., the gyro output (digital angular velocity output G3), it is possible to utilize the digital data G3 in a host computer for navigation computation. Also, by converting the digital data G3 via the D/A converter 91 into the corresponding analog signal and integrating the analog signal by the integrator 92, it is possible to obtain the analog angle output G2. This analog angle output G2 can be utilized for a control of a servomotor or the like.

Figure 14:
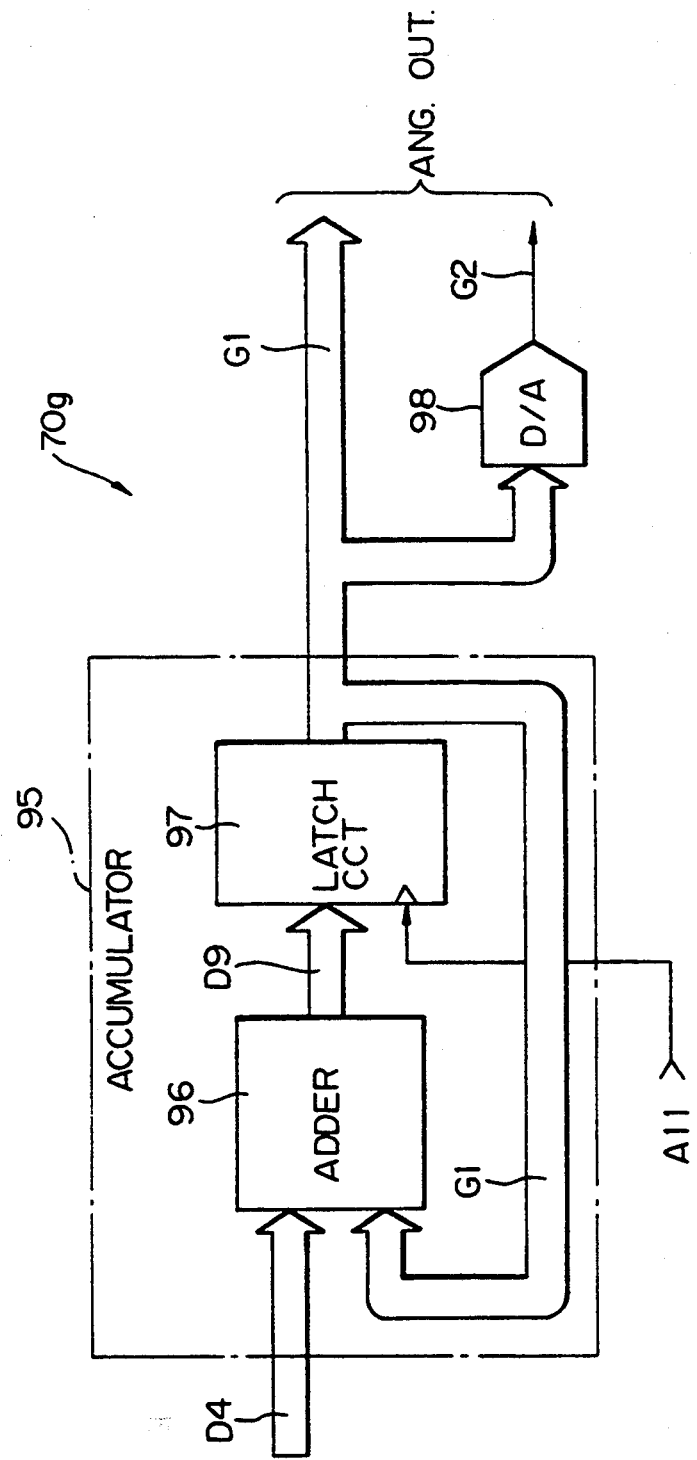
FIG. 14 is a block diagram illustrating a modification of the gyro output generating circuit shown in FIG. 13.

FIG. 14 illustrates a modification (70g) of the gyro output generating circuit 70f shown in FIG. 13.

The illustrated gyro output generating circuit 70g includes an accumulator 95, responsive to the clock signal A11, for accumulating the digital frequency data D4 output from the frequency setting unit 50 and outputting the accumulated result as a gyro output (digital angle output G1), and a D/A converter 98 for converting the output G1 of the accumulator 95 into an analog signal to thereby generate another gyro output (analog angle output G2). The accumulator 95 includes an adder 96 for adding the digital frequency data D4 to a previous last added data (digital angle output G1), and a latch circuit 97, responsive to the clock signal A11, for latching an output data D9 of the adder 96 and outputting the latched result as the digital angle output G1.

In the present example, the digital frequency data D4 indicates an input angular velocity updated at a cycle in synchronization with the clock signal A11. Accordingly, by accumulating the data D4 in response to the clock signal A11, it is possible to obtain the digital angle output G1. This digital data G1 can be utilized in a host computer for navigation computation, attitude control, and the like. Also, by converting the digital data G1 via the D/A converter 98 into the corresponding analog signal, it is possible to obtain the analog angle output G2. This analog data G2 can be utilized for a control of a servomotor or the like.

Next, a third embodiment of the present invention will be explained with reference to FIG. 15.

Figure 15:
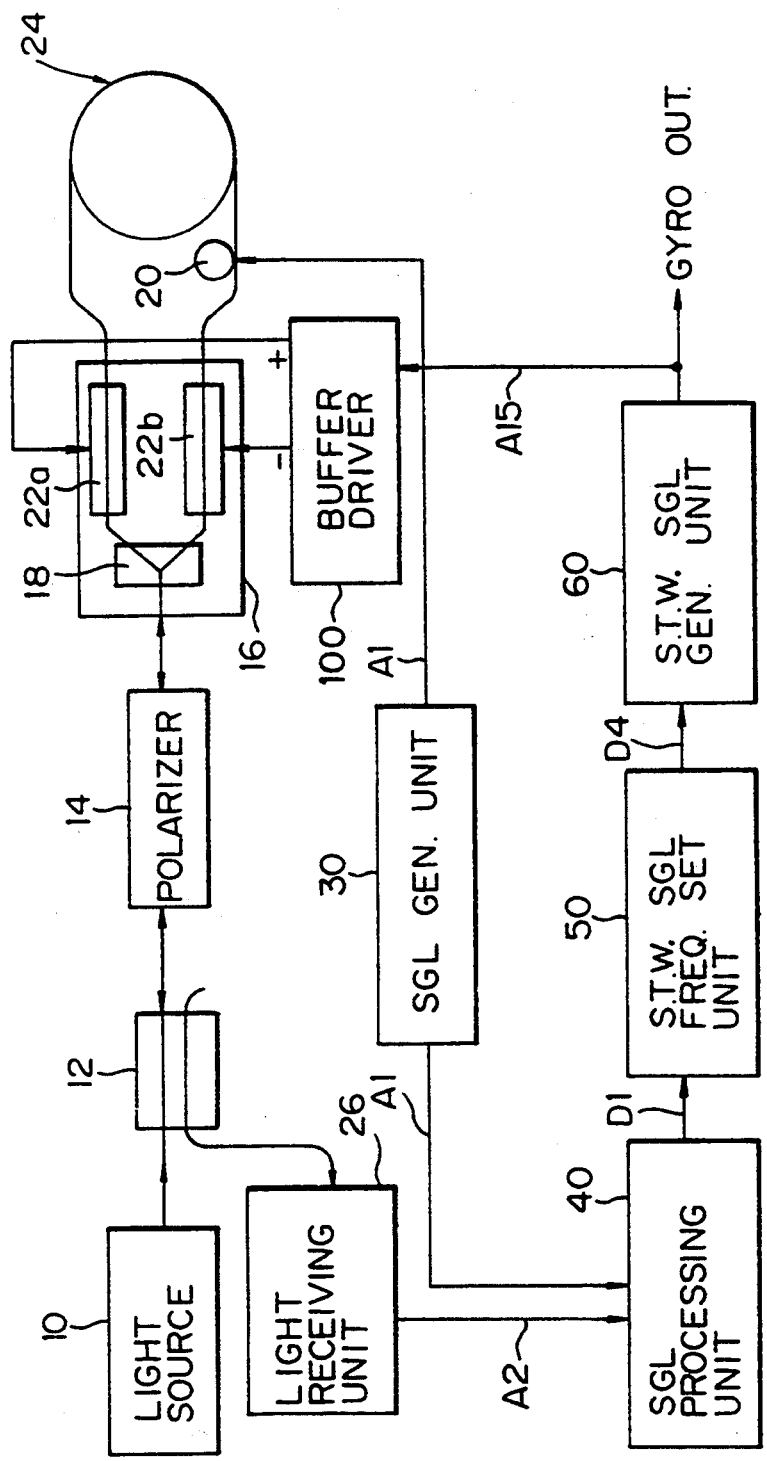
FIG. 15 is a block diagram illustrating, partially schematically, a constitution of the serrodyne modulation fiber optical gyro according to a third embodiment of the present invention.

FIG. 15 illustrates, partially schematically, a constitution of the serrodyne modulation fiber optical gyro according to the third embodiment.

The illustrated constitution is intended to solve the problems posed by the prior art fiber optical gyro shown in FIG. 1. Also, the illustrated constitution and the operation thereof are the same as those of the first embodiment shown in FIGS. 2 and 3, except for the points described below, and thus the explanation thereof is omitted.

First, a pair of serrodyne modulators 22a and 22b are provided in place of the single serrodyne modulator 22 in FIG. 2. In this case, a first serrodyne modulator 22a is located at one end of the optical fiber loop 24 and a second serrodyne modulator 22b is located at the opposite end thereof.

Second, a buffer driver 100 is additionally provided. The buffer driver 100 has the function of receiving the analog sawtooth waveform signal A15 from the sawtooth waveform signal generating unit 60, applying the signal A15 to each serrodyne modulator 22a, 22b in the opposite phase and thereby driving the respective serrodyne modulators. In the present embodiment, the sawtooth waveform signal A15 is applied to the first serrodyne modulator 22a in the positive ramp (+) and applied to the second serrodyne modulator 22b in the negative ramp (−).

According to the constitution of the third embodiment, the serrodyne modulators 22a,22b are provided in symmetrical positions with respect to the optical fiber loop 24. Accordingly, under a condition that each amplitude of phase quantities by the respective serrodyne modulations is $2\pi$, phase differences $\phi m_1$, $\phi m_2$, induced by the respective serrodyne modulators 22a,22b are expressed from the formula (3) as follows:

$$\phi m_1 = 2\pi n \, L f m / C \quad (9a)$$

$$\phi m_2 = 2\pi n \, L (-f m)/C \quad (9b)$$

Therefore, the total phase difference $\phi m'$ induced by two serrodyne modulators 22a,22b is expressed by the following formula:

$$\begin{aligned}\phi m' &= \phi m_1 - \phi m_2 \\ &= 2\pi n \, L f m / C - 2\pi n \, L (-f m)/C \\ &= 2 \cdot 2\pi n \, L f m / C\end{aligned} \quad (9)$$

Assuming that the phase difference $\Delta\phi'(=\phi s + \phi m')$ is equal to zero, the relationship below is induced from the formulas (4) and (9).

$$\begin{aligned}\Omega' &= n\lambda \cdot 2f m / 2R \\ &= 2 \cdot \Omega\end{aligned} \quad (10)$$

Thus, by measuring the frequency of the sawtooth waveform signal (serrodyne modulation signal) as in the prior art, it is possible to expand a detectable range of the input rotation angular velocity twice that of the prior art without heightening the frequency of the sawtooth waveform signal.

Also, it is possible to maintain a good linearity and scale factor stability of the gyro output as in the embodiment of FIG. 3.

Although, in the above third embodiment, the phase modulator 20 is provided separately from the electro-optic crystal substrate 16, it may be provided on the crystal substrate 16 as shown in FIG. 2.

Also, the phase modulator 20 may be constituted such that it is incorporated into the serrodyne modulator 22a or 22b. In this case, there can be proposed, for example, a circuit constitution which mixes a serrodyne modulation signal of a positive or negative ramp with a phase modulation signal having a sinusoidal or square waveform of a constant frequency and applies the mixed signal to one of the serrodyne modulators 22a,22b provided on the crystal substrate 16.

Next, the optical waveguide type phase modulator according to an embodiment of the present invention will be explained with reference to FIGS. 16 to 21B.

In the like manner as the first embodiment, the related prior art will be first explained with reference to FIGS. 16, 17A and 17B.

Figure 16:
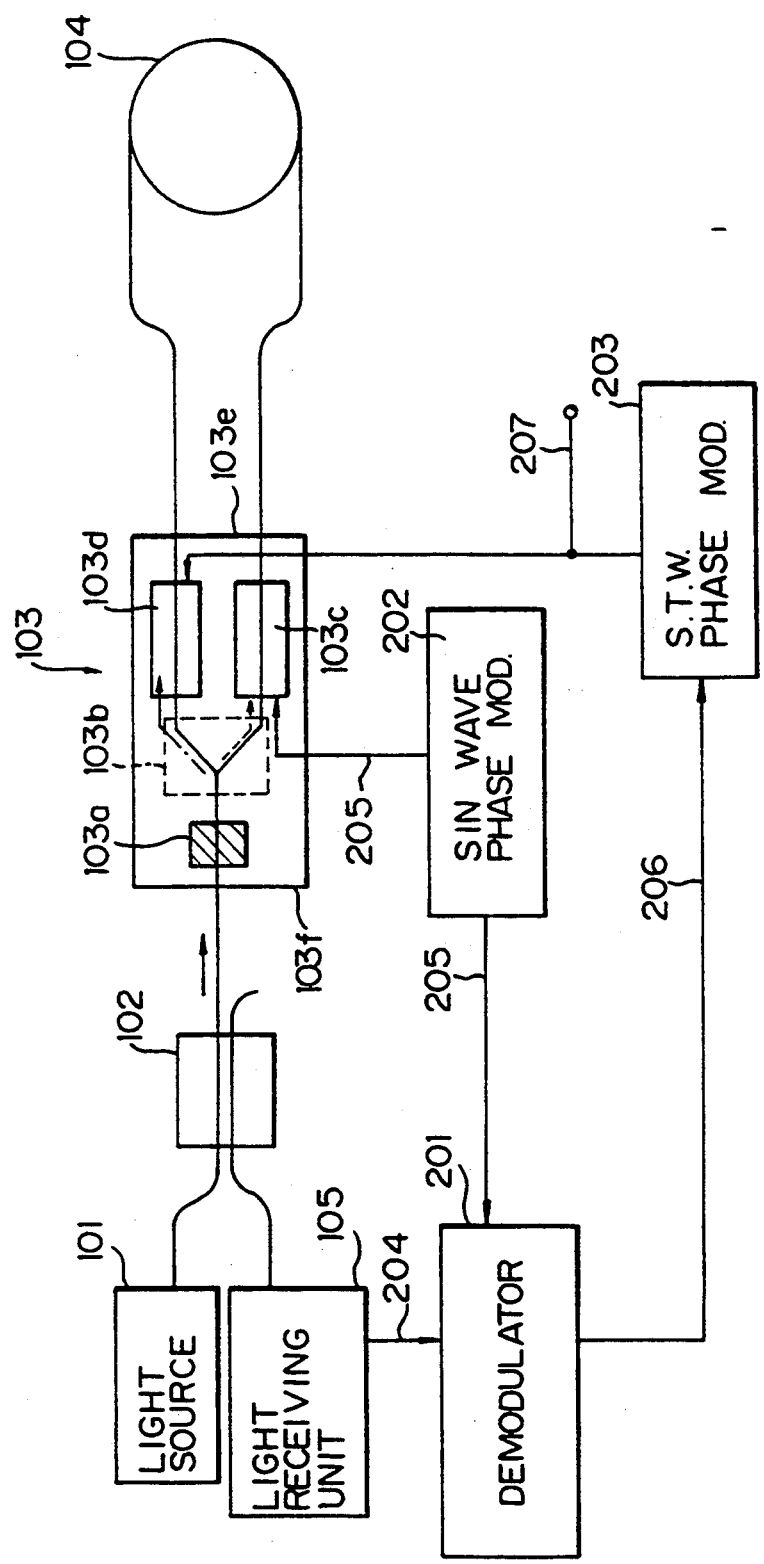
FIG. 16 is a block diagram illustrating, partially schematically, a constitution of a fiber optical gyro using a prior art optical waveguide type phase modulator.
Figure 17A:
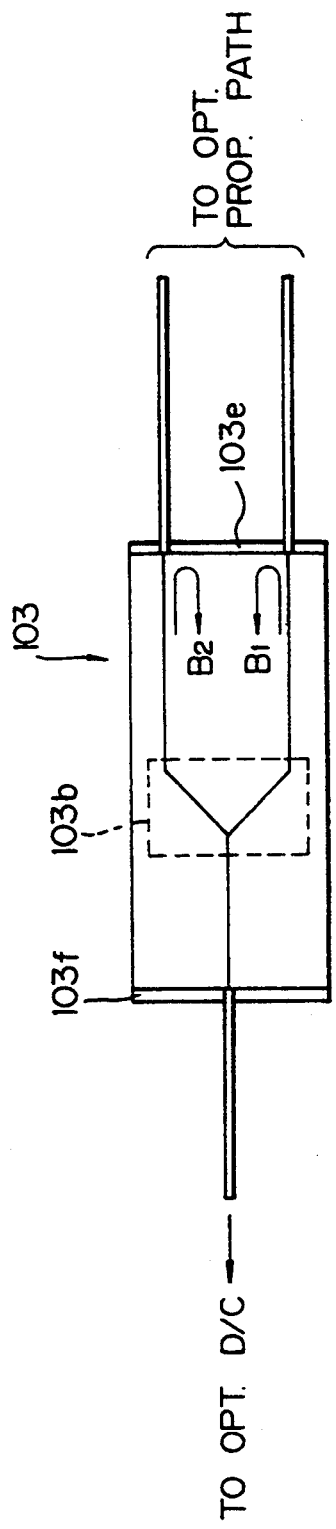
FIGS. 17A and 17B are a plan view and a side view, respectively, schematically illustrating a shape of the phase modulator shown in FIG. 16.
Figure 17B:
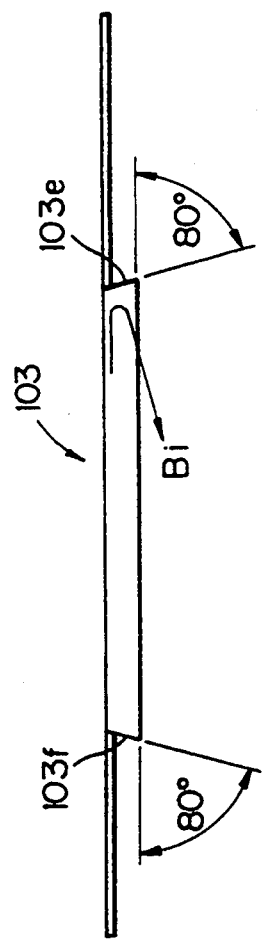

FIG. 16 illustrates, partially schematically, a constitution of a fiber optical gyro using a prior art optical waveguide type phase modulator, and FIGS. 17A and 17B schematically illustrate a shape of the prior art phase modulator.

In FIG. 16, reference 101 denotes a light source; reference 102 an optical distributor and coupler; reference 103 an optical waveguide type phase modulator; reference 104 an optical propagation path formed by a single mode optical fiber wound perpendicularly with respect to the rotation axis and conserving the plane of polarization; reference 105 a photoelectric transducing circuit; reference 201 a demodulator; reference 202 a sinusoidal waveform phase modulating circuit; reference 203 a sawtooth waveform phase modulating circuit; reference 204 a photoelectric output signal; reference 205 a sinusoidal waveform phase modulation drive signal; reference 206 an output of the demodulator 201; and reference 207 a gyro output. The gyro output 207 is used as a sawtooth waveform phase modulation drive signal.

The optical waveguide type phase modulator 103 includes a polarizer 103a, a Y-shaped branch 103b, a sinusoidal waveform phase modulator 103c and a sawtooth waveform phase modulator 103d. Note, references 103e and 103f denote an end surface of the optical waveguide type phase modulator 103, respectively. An example of the optical waveguide type phase modulator is taught by H. C. LEFEVRE et al. in "*INTEGRATED OPTICS: A PRACTICAL SOLUTION FOR THE FIBER-OPTIC GYROSCOPE, PROCEEDING OF SPIE*, Vol. 719, FIBER-OPTIC GYROS, p. 101, 1986".

In the constitution of FIG. 16, a first light beam emitted from the light source 101 is received at the optical distributor and coupler 102 and then split into second and third light beams. The second light beam is propagated in the direction shown by an arrow mark of a solid line and received at the polarizer 103a in the optical waveguide type phase modulator 103. A portion of the second light beam, i.e., only the polarized component, is transmitted through the polarizer 103a and received at the Y-shaped branch 103b. The second light beam incident on the Y-shaped branch 103b is split into fourth and fifth light beams.

The fourth light beam is propagated in the direction shown by an arrow mark of a broken line and received at the sinusoidal waveform phase modulator 103c to be given a sinusoidal waveform phase modulation of $\Phi m \sin(\omega mt)$. Note, $\Phi m$ indicates a maximum phase shift of the sinusoidal waveform phase modulation; $\omega m$ a drive angular frequency for the phase modulator 103c; and t a time. The fourth light beam which has been given the sinusoidal waveform phase modulation is separated into a sixth light beam which is to be incident on the optical propagation path 104, and a seventh light beam which is reflected from the end surface 103e (see FIG. 17A, reflected light beam B1). The sixth light beam is propagated counterclockwise through the optical propagation path 104 and then received at the sawtooth waveform phase modulator 103d to be given a sawtooth waveform phase modulation of q $\omega_{s\,t}(t-\tau)$. This is a periodic function with respect to the range of $-\pi \sim +\pi$[rad]. Note, q indicates a gradient of the sawtooth waveform; $\omega_{s\,t}$ a drive angular frequency for the phase modulator 103d; and $\tau$ a propagation delay time in the optical propagation path 104. The sixth light beam which has been given the sawtooth waveform phase modulation is received at the Y-shaped branch 103b. On the other hand, the seventh light beam is received again at the sinusoidal waveform phase modulator 103c to be given a sinusoidal waveform phase modulation of $\Phi m \sin[(\omega m(t-t_1)]$. Note, $t_1$ indicates a time twice a delay time of propagation from the phase modulator 103c to the end surface 103e. The seventh light beam which has been given the sinusoidal waveform phase modulation is received at the Y-shaped branch 103b.

On the other hand, the fifth light beam is propagated from the Y-shaped branch 103b in the direction shown by an arrow mark of a dot-and-dash line and received at the sawtooth waveform phase modulator 103d to be given a sawtooth waveform phase modulation of q $\omega_{s\,t}t$. The fifth light beam which has been given the sawtooth waveform phase modulation is separated into an eighth light beam which is to be incident on the optical propagation path 104, and a ninth light beam which is reflected from the end surface 103e (see FIG. 17A, reflected light beam B2). The eighth light beam is propagated clockwise through the optical propagation path 104 and then received at the sinusoidal waveform phase modulator 103c to be given a sinusoidal waveform phase modulation of $\Phi m \sin[(\omega m(t-\tau)]$. The eighth light beam which has been given the sinusoidal waveform phase modulation is received at the Y-shaped branch 103b. On the other hand, the ninth light beam is received again at the sawtooth waveform phase modulator 103d to be given a sawtooth waveform phase modulation of q $\omega_{s\,t}(t-t_2)$. Note, $t_2$ indicates a time twice a delay time of propagation from the phase modulator 103d to the end surface 103e. The ninth light beam which has been given the sawtooth waveform phase modulation is received at the Y-shaped branch 103b.

The sixth and eighth light beams incident on the Y-shaped branch 103b are coupled to produce a tenth light beam and the seventh and ninth light beams incident on the Y-shaped branch 103b are coupled to produce an eleventh light beam. The tenth and eleventh light beams are received at the polarizer 103a and respective portions thereof, i.e., only the polarized components, are transmitted through the polarizer 103a. The polarized tenth light beam is received at the optical distributor and coupler 102 and split into twelfth and thirteenth light beams. Also, the polarized eleventh light beam is received at the optical distributor and coupler 102 and split into fourteenth and fifteenth light beams. The thirteenth and fifteenth light beams are received at the photoelectric transducing circuit 105. Note, the thirteenth light beam is a light beam having information on a phase difference of light based on Sagnac effect, and the fifteenth light beam is a disturbance beam due to a reflected light from the end surface in the optical waveguide type phase modulator.

The photoelectric output signal 204 together with the sinusoidal waveform phase modulation drive signal 205 is input to the demodulator 201 and thereby a scalar product of both signals is obtained. The output signal 206 of the demodulator 201 is expressed as follows:

$$V_0 \propto -(2/\pi)P_o(V_S+V_R) \quad (11)$$

$$V_S = \gamma[\phi_S]J_1(\eta_1) \times \sin(\phi_S + q\omega_{st}\tau) \quad (12)$$

$$V_R = K\gamma[\phi_R]J_1(\eta_2) \times \sin[\phi_R + \theta_R + q\omega_{st}(2t-t_2)] \quad (13)$$

$$\eta_1 = 2\Phi m \sin(\omega m\tau/2) \quad (14)$$

$$\eta_2 = 2\Phi m \cos(\omega m t_1/2) \approx 2\Phi m \quad (15)$$

$$\gamma[\phi_S] = \exp[-(\lambda\phi_S/2/(\ln 2)^{\frac{1}{2}}/L_c)^2] \quad (16)$$

$$\gamma[\phi_R] = \exp[-(\lambda\phi_R/2/(\ln 2)^{\frac{1}{2}}/L\,c)^2] \quad (17)$$

$$\phi_S = 4\pi R\,L_F\Omega/\lambda C \quad (18)$$

$$\phi_R = 2\pi\,L_R/\lambda \quad (19)$$

$$L_c = \lambda^2/\delta\lambda \quad (20)$$

Note, $V_0$ indicates the output signal 206 of the demodulator 201; $P_0$ a quantity of incoherent light of the thirteenth or fifteenth light beam; $\gamma[\phi_S]$ a coherency of the thirteenth light beam; $\gamma[\phi_R]$ a coherency of the fifteenth light beam; $J_1$ a first-order Bessel function; $\eta_1$ a phase modulation index of thirteenth light beam; $\eta_2$ a phase modulation index of fifteenth light beam; K a reflection coefficient at the end surface 103e; $\phi_S$ the phase difference of light based on Sagnac effect; R a radius of the optical propagation path; $L_F$ a length of the optical propagation path; $\Omega$ an input rotation angular velocity; $\lambda$ a wavelength of light in a vacuum atmosphere; C a speed of light in the vacuum atmosphere; $\phi_R$ a phase difference between the seventh and ninth light beams; $L_R$ an optical path difference between the seventh and ninth light beams; $\theta_R$ an additional phase caused by the reflection from the end surface 103e; $L_c$ a coherent length; and $\delta\lambda$ a half-value width of spectrum of the light emitted from the light source 101 in the vacuum atmosphere.

Note, the formulas (16),(17) hold good with respect to a light having Gaussian distribution spectrum such as a light emitted from a super luminescent diode frequently used as a light source for a fiber optical gyro.

By the way, the formula (13) can be rewritten as follows:

$$V_R = K\gamma[\phi_R]J_1(\eta_2) \times [\sin(\phi_{R1})\cos(\phi\,s + q\,\omega_{st}\,\tau) + \cos(\phi_{R1})\sin(\phi\,s + q\,\omega_{st}\,\tau)] \quad (21)$$

$$\phi_{R1} = \phi_R + \theta_R + q\,\omega_{st}(2t-t_2) - \phi_S - q\,\omega_{st}\tau \quad (22)$$

Also, from the formula (21), the formula (11) can be rewritten as follows:

$$V_0 \propto -(2/\pi)P_0 \times A \sin(\phi_S + q\,\omega_{st}\tau + \phi_E) \quad (23)$$

$$A^2 = [\gamma[\phi_S]J_1(\eta_1) = K\gamma[\phi_R]J_1(\eta_2)\cos(\phi_{R1})]^2 + [K\gamma[\phi_R]J_1(\eta_2)\cos(\phi_{R1})]^2 \quad (24)$$

$$|\phi_E| = \tan^{-}(K\gamma[\phi_R]J_1(\eta_2)\cos(\phi_{R1})/[\gamma[\phi_S]J_1(\eta_1) + K\gamma[\phi_R]J_1(\eta_2)\cos(\phi_{R1})]) \quad (25)$$

Note, the following particulars can be deduced. ① In a range of a normal input angular velocity, $\gamma[\phi_S] \approx 1$. ② For the purpose of a decrease in a bias fluctuation, $\omega m = \pi/\eta$, i.e., $\eta_1 = \eta_2$. ③ From the definition of the coherency, $\gamma[\phi_R] \leq 1$. ④ The reflection coefficient K <1. Accordingly, the formulas (24),(25) can be rewritten as follows:

$$A \approx \gamma[\phi_S]J_1(\eta_1) \quad (26)$$

$$|\phi_E| \approx \tan^{-}|[K\gamma[\phi_R]\cos(\phi_{R1})]| \leq K\gamma[\phi_R] \quad (27)$$

In the above fiber optical gyro using the prior art optical waveguide type phase modulator, the sawtooth waveform phase modulating circuit 203 changes the angular frequency $\omega_{st}$ and the polarity q of the sawtooth waveform phase modulation drive signal 207 so that the demodulator output signal $V_0$ (206) expressed by the formula (23) becomes zero (0). Accordingly, the angular frequency $\omega_{st}$ and the polarity q corresponding to the error phase $\phi_E$ produce an error bias even if the input angular velocity is zero, i.e., the phase difference $\phi_S$ of light based on Sagnac effect is zero. Also, since the additional phase $\theta_R$ due to the reflection from the end surface fluctuates at random, a problem occurs in that a bias fluctuation is caused.

On the other hand, referring to FIGS. 17A and 17B, the optical waveguide type phase modulator 103 is constituted such that the end surface 103e is formed to be smooth perpendicularly relative to the direction of the propagation of the light (see FIG. 17A) and with a tilt of approximately 10° relative to the direction of the thickness of the modulator (see FIG. 17B). Accordingly, the reflection coefficient K is decreased to approximately $10^{-5}$. Since the optical path difference between the seventh and ninth light beams is zero ($L_R = 0$), however, $\gamma[\phi_R]$ is equal to one from the formulas (17),(19). Also, from the formula (27), an absolute value of the error phase $\phi_E$ is equal to or less than $10^{-5}$ [rad]. Accordingly, where an optical scale factor SF ($=4\pi R\,L_F/\lambda C$) is one [deg/(°/sec)], a bias fluctuation of ±2 [°/hr] is caused.

Namely, the above fiber optical gyro using the prior art optical waveguide type phase modulator has posed a problem in that the bias fluctuation due to the reflected lights B1,B2 from the end surface 103e of the phase modulator is not negligible, because the optical path difference between the reflected lights B1,B2 is zero.

FIGS. 18A and 18B schematically illustrate a shape of the optical waveguide type phase modulator according to a preferred embodiment of the present invention, each showing a plan view and a side view, respectively.

The illustrated optical waveguide type phase modulator 110 can be substituted for the optical waveguide type phase modulator 103 shown in FIG. 16. End surfaces 111 and 112 of the phase modulator 110 are formed to be smooth with a tilt of an angle $\alpha$ relative to the direction of the propagation of the light in the plane containing the fourth and fifth light beams split by the Y-shaped branch 103b (see FIG. 18A). Also, the end surfaces 111 and 112 are formed to be smooth perpendicularly relative to the direction of the thickness of the modulator (see FIG. 18B).

According to the constitution of the present embodiment, an optical path difference ($L_R$) not equal to zero is caused between the seventh light beam B1 and the ninth light beam B2 reflected from the end surface 111, as expressed by the following formula:

$$L_R = 2n_W \cdot L_G \\ = 2n_W \cdot H_W \cdot \tan(90° - \alpha) \quad (28)$$

Note, $n_W$ indicates a refractive index of the optical waveguide portion in the phase modulator 110; $L_G$ a geometric propagation difference between the reflected lights; and $H_W$ a width between the optical waveguides in the Y-shaped branch 103b.

Also, the optical waveguide type phase modulator of the present embodiment is characterized in that the relationship below is satisfied with respect to a bias fluctuation width β [rad/sec] required in the ordinary fiber optical gyro. Namely, $$\exp[-(\pi L_R/(\ln 2)^{\frac{1}{2}}/L_c)^2] \leq \beta \cdot SF \quad (29)$$

Now, it is assumed that: the wavelength λ of the light source 101 is 0.84[μm]; the coherent length $L_c$ is approximately 50[μm]; the refractive index $n_W$ of the optical waveguide portion in the phase modulator 110 is approximately 2.2 (in case of LiNbO$_3$); and the width $H_W$ between the optical waveguides is 125[μm]. In this case, assuming that, to obtain the reflection coefficient K ($\approx 10^{-5}$) equivalent to that in the prior art, the tilt angle α of the end surface 111, 112 is approximately 80° the coherency $\Theta[\phi_R]$ is expressed from the formula (17) as follows:

$$\gamma[\phi_R] \approx 5.45 \times 10^{-24}$$

Accordingly, in the fiber optical gyro using the optical waveguide type phase modulator of the present embodiment, the error phase $\phi_E$ is expressed from the formula (27) as follows:

$$\phi_E \leq 5.45 \times 10^{-29} \text{ [rad]}$$

Namely, where the optical scale factor SF ($=4\pi R\,L_F/\lambda C$) is one [deg/(°/sec)], the bias fluctuation due to the reflected lights B1,B2 from the end surface 111 of the phase modulator 110 is reduced to $\pm 10^{-23}$ [°/hr]. This value is substantially negligible, compared with that (±2[°/hr]) in the prior art.

As explained above, the optical waveguide type phase modulator of the present embodiment is constituted such that it has the reflection coefficient equivalent to that in the prior art, and that, when two light beams split by the Y-shaped branch 103b are emitted from the phase modulator 110 toward the optical propagation path 104, an optical path difference not equal to zero (see formula (28)) is caused between the two reflected beams B1 and B2 from the end surface 111. As a result, it is possible to minimize the bias fluctuation due to the reflected light beams from the end surface 111 at the joint to the optical propagation path 104.

Although, in the above embodiment, the end surfaces 111, 112 of the phase modulator 110 are formed with the tilt angle α relative to the direction of the propagation of the light and perpendicularly relative to the direction of the thickness of the modulator, the shape thereof is not restrictive.

Figure 19A:
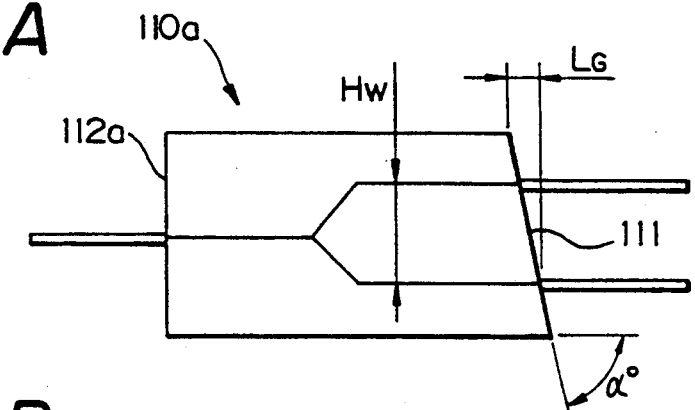
FIGS. 19A and 19B are a plan view and a side view, respectively, illustrating a first modification of the embodiment of FIGS. 18A and 18B.
Figure 19B:
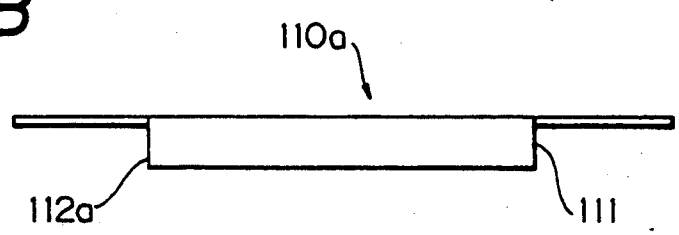

FIGS. 19A and 19B illustrate a first modification of the embodiment of FIGS. 18A and 18B.

In the present example, one (112a) of two end surfaces 111, 112a of the phase modulator 110a is formed perpendicularly relative to both the direction of the propagation of the light and the direction of the thickness of the modulator.

Figure 20A:
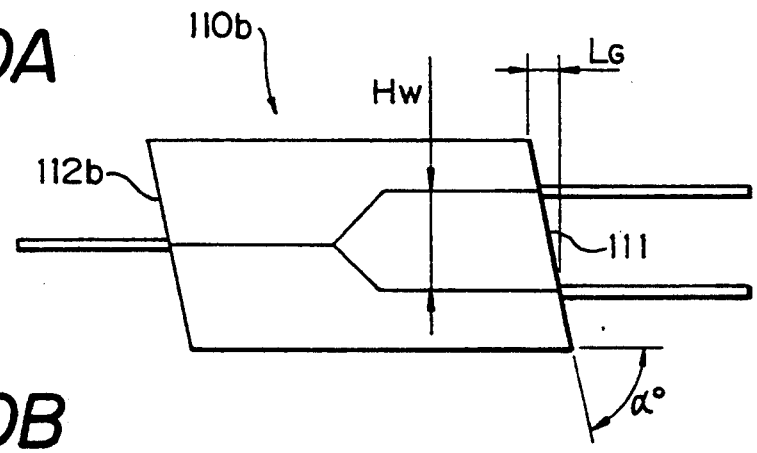
FIGS. 20A and 20B are a plan view and a side view, respectively, illustrating a second modification of the embodiment of FIGS. 18A and 18B.
Figure 20B:
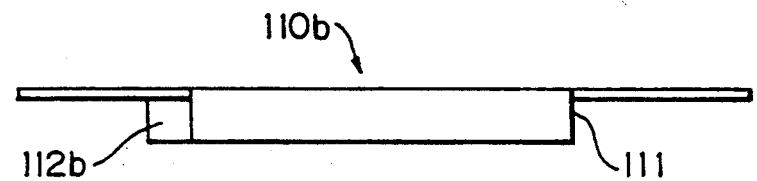

FIGS. 20A and 20B illustrate a second modification of the embodiment of FIGS. 18A and 18B.

In the present example, one (112b) of two end surfaces 111, 112b of the phase modulator 110b is formed with a certain tilt angle, in the opposite direction to the case of FIG. 18A, relative to the direction of the propagation of the light and perpendicularly relative to the direction of the thickness of the modulator.

Figure 21A:
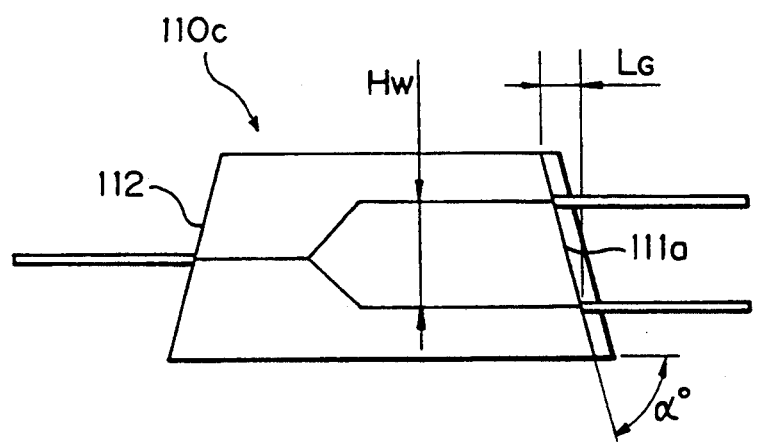
FIGS. 21A and 21B are a plan view and a side view, respectively, illustrating a third modification of the embodiment of FIGS. 18A and 18B.
Figure 21B:
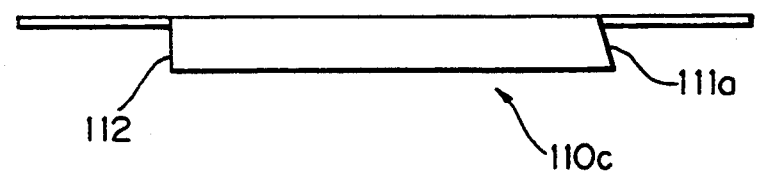

FIGS. 21A and 21B illustrate a third modification of the embodiment of FIGS. 18A and 18B.

In the present example, one (111a) of two end surfaces 111a, 112 of the phase modulator 110c is formed with the tilt angle α relative to the direction of the propagation of the light and with a certain tilt angle relative to the direction of the thickness of the modulator.

Also, although, in the above embodiment, the polarizer (103a) and the sawtooth waveform phase modulator (103d) are incorporated into the optical waveguide type phase modulator, they may be provided separately from the phase modulator.

Furthermore, the optical waveguide type phase modulator according to the present invention is applicable to a simple phase modulation fiber optical gyro which is not provided with a sawtooth waveform phase modulator (103d) and a sawtooth waveform phase modulating circuit (203).

Although the present invention has been disclosed and described by way of several embodiments, it is apparent to those skilled in the art that other embodiments and modifications of the present invention are possible without departing from the spirit or essential features thereof.

We claim:

1. An optical gyro comprising:
   an optical propagation path in cooperation with a rotation axis, for propagating a pair of light beams therethrough simultaneously clockwise and counterclockwise, respectively;
   an optical system, optically coupled to the optical propagation path, for giving a phase modulation by means of a signal of a constant frequency and a serrodyne modulation by means of an analog sawtooth waveform signal of a variable frequency to the light beams propagated in opposite directions, detecting coherent lights from the respective modulated light beams propagated in opposite directions, and outputting a photoelectric output signal corresponding to the coherent light intensity;
   a signal processing means, operatively connected to the optical system, for taking components in synchronization with the signal of the constant frequency from the photoelectric output signal and thereby outputting a digital error data corresponding to a phase difference of light between the light beams propagated in opposite directions;
   a frequency setting means, operatively connected to the signal processing means, for digitally setting a frequency of the sawtooth waveform signal for serrodyne modulation based on the error data, said frequency setting means comprising
   a digital multiplication means for multiplying the digital error data by a digital data indicating a coefficient for determining a feedback loop gain and thereby outputting a digital control data, and
   an addition means for adding the digital control data to a previous last set frequency data of the sawtooth waveform signal to thereby output the digitally set frequency data; and
   a sawtooth waveform signal generating means, operatively connected between the frequency setting means and the optical system, for generating the analog sawtooth waveform signal based on the digitally set frequency data, wherein the frequency of the sawtooth waveform signal for serrodyne modulation is changed to thereby control the digital error data to be a value corresponding to the phase difference of light, said sawtooth waveform signal generating means comprising
   an addition means for adding the digitally set frequency data output from the frequency setting means to a previous last added data, and outputting a carry signal where the added result produces an overflow,
   a counter means for counting the number of the carry signal by an incremental or decremental operation to thereby output a digital sawtooth waveform signal, and
   a D/A converter for converting the digital sawtooth waveform signal into the analog sawtooth waveform signal.

2. An optical gyro as set forth in claim 1, further comprising a latch means, responsive to an external clock signal, for latching a newly added data output from the addition means during a time corresponding to one clock.

3. An optical gyro as set forth in claim 1, further comprising a latch means, responsive to an external clock signal, for latching the digitally set frequency data during a time corresponding to one clock.

4. An optical gyro as set forth in claim 1, wherein the addition means outputs a control signal together with the digitally set frequency data, the control signal indicating a sign of the digitally set frequency data and being used for switching the operation of the counter means.

5. An optical gyro as set forth in claim 1, wherein the analog sawtooth waveform signal is taken out as a gyro output.

6. An optical gyro as set forth in claim 1, wherein a specific bit other than the most significant bit among the digital sawtooth waveform signal data output from the counter means is taken out as a gyro output.

7. An optical gyro as set forth in claim 6, wherein the counter means is constituted by a binary counter.

8. An optical gyro as set forth in claim 4, wherein the control signal and the carry signal are taken out as a gyro output, respectively.

9. An optical gyro as set forth in claim 8, wherein the counter means is constituted by a binary counter.

10. An optical gyro as set forth in claim 1, wherein the digitally set frequency data is taken out as a gyro output.

11. An optical gyro as set forth in claim 4, further comprising a gyro output generating means for generating gyro outputs in response to the control signal and an arbitrary one bit among the digital sawtooth waveform signal data output from the counter means.

12. An optical gyro as set forth in claim 11, wherein the gyro output generating means comprises:
   a counter means, responsive to the control signal, for counting the arbitrary one bit by an incremental or decremental operation to thereby output a digital angle output; and
   a D/A converter for converting the digital angle output into a corresponding analog angle output.

13. An optical gyro as set forth in claim 11, wherein the gyro output generating means comprises;
   a timer for generating a timing signal at an arbitrary time interval;
   a counter means, responsive to the control signal, for counting the arbitrary one bit and clearing the counted value in response to the timing signal;
   a latch circuit, responsive to the timing signal, for latching an output of the counter means to thereby output a digital angular velocity output; and
   a D/A converter for converting the digital angular velocity output into a corresponding analog angular velocity output.

14. An optical gyro as set forth in claim 11, wherein the gyro output generating means comprises first and second generating units, the first generating unit including: a counter means, responsive to the control signal, for counting the arbitrary one bit by an incremental or decremental operation to thereby output a digital angle output; and a D/A converter for converting the digital angle output into a corresponding analog angle output, and the second generating unit including: a timer for generating a timing signal at an arbitrary time interval; a counter means, responsive to the control signal, for counting the arbitrary one bit and clearing the counted value in response to the timing signal; a latch circuit, responsive to the timing signal, for latching an output of the counter means to thereby output a digital angular velocity output; and a D/A converter for converting the digital angular velocity output into a corresponding analog angular velocity output.

15. An optical gyro as set forth in claim 4, further comprising a gyro output generating means for generating gyro outputs in response to the control signal and the carry signal.

16. An optical gyro as set forth in claim 15, wherein the gyro output generating means comprises:
   a counter means, responsive to the control signal, for counting the carry signal by an incremental or decremental operation to thereby output a digital angle output; and
   a D/A converter for converting the digital angle output into a corresponding analog angle output.

17. An optical gyro as set forth in claim 15, wherein the gyro output generating means comprises;
   a timer for generating a timing signal at an arbitrary time interval;
   a counter means, responsive to the control signal, for counting the carry signal and clearing the counted value in response to the timing signal;
   a latch circuit, responsive to the timing signal, for latching an output of the counter means to thereby output a digital angular velocity output; and
   a D/A converter for converting the digital angular velocity output into a corresponding analog angular velocity output.

18. An optical gyro as set forth in claim 15, wherein the gyro output generating means comprises first and second generating units, the first generating unit including: a counter means, responsive to the control signal, for counting the arbitrary one bit by an incremental or decremental operation to thereby output a digital angle output; and a D/A converter for converting the digital angle output into a corresponding analog angle output, and the second generating unit including: a timer for generating a timing signal at an arbitrary time interval; a counter means, responsive to the control signal, for counting the arbitrary one bit and clearing the counted value in response to the timing signal; a latch circuit, responsive to the timing signal, for latching an output of the counter means to thereby output a digital angular velocity output; and a D/A converter for converting the digital angular velocity output into a corresponding analog angular velocity output.

19. An optical gyro as set forth in claim 1, further comprising a gyro output generating means for generating gyro outputs based on the digitally set frequency data.

20. An optical gyro as set forth in claim 19, wherein the gyro output generating means comprises:
   a D/A converter for converting the digitally set frequency data into a corresponding analog signal and outputting the digitally set frequency data as a digital angular velocity output; and
   an integrator for integrating the corresponding analog signal to thereby output an analog angle output.

21. An optical gyro as set forth in claim 19, wherein the gyro output generating means comprises:
   an accumulator, responsive to an external clock signal used in the frequency setting means, for accumulating the digitally set frequency data to thereby output a digital angle output; and
   a D/A converter for converting the digital angle output into a corresponding analog angle output.

22. An optical gyro as set forth in claim 1, wherein the optical propagation path is constituted by an optical fiber.

23. An optical gyro comprising:
   an optical propagation path in cooperation with a rotation axis, for propagating a pair of light beams therethrough simultaneously clockwise and counterclockwise, respectively;
   an optical system, optically coupled to the optical propagation path, for giving a phase modulation by means of a signal of a constant frequency and a serrodyne modulation by means of an analog sawtooth waveform signal of a variable frequency of the light beams propagated in opposite directions, detecting coherent lights from the respective modulated light beams propagated in opposite directions, and outputting a photoelectric output signal corresponding to the coherent light intensity;
   a signal processing means, operatively connected to the optical system, for taking components in synchronization with the signal of the constant frequency from the photoelectric output signal and thereby outputting a digital error data corresponding to a phase difference of light between the light beams propagated in opposite directions;
   a frequency setting means, operatively connected to the signal processing means, for digitally setting a frequency of the sawtooth waveform signal for serrodyne modulation based on the error data, said frequency setting means comprising a digital multiplication means for multiplying the digital error data by a digital data indicating a coefficient for determining a feedback loop gain and thereby outputting a digital control data, and an addition means for adding the digital control data to a previous last set frequency data of the sawtooth waveform signal to thereby output the digitally set frequency data; and a sawtooth waveform signal generating means, operatively connected between the frequency setting means and the optical system, for generating the analog sawtooth waveform signal based on the digitally set frequency data, said sawtooth waveform signal generating means comprising an addition means for adding the digitally set frequency data output from the frequency setting means to a previous last added data, and outputting a carry signal where the added result produces an overflow, a counter means for counting the number of the carry signal by an incremental or decremental operation to thereby output a digital sawtooth waveform signal, and a D/A converter for converting the digital sawtooth waveform signal into the analog sawtooth waveform signal, wherein the optical system includes:

a first serrodyne modulator provided at one end of the optical propagation path;

a second serrodyne modulator provided at the other end of the optical propagation path; and means for applying the analog sawtooth waveform signal to the first serrodyne modulator in a positive ramp and to the second serrodyne modulator in a negative ramp, respectively, and thereby driving the respective serrodyne modulators.

24. An optical gyro as set forth in claim 23, wherein the optical propagation path is constituted by an optical fiber.

25. An optical waveguide type phase modulator used in a fiber optical gyro in which light is propagated simultaneously clockwise and counterclockwise through an optical fiber coil in cooperation with a rotation axis and receives a phase modulation and thus a phase difference of light based on Sagnac effect is detected to thereby obtain an output indicating an angular velocity or angular increment, wherein the optical waveguide type phase modulator is formed integrally with an optical distributing and coupling unit jointed to an optical propagation path optically coupled to the optical fiber coil, and an end surface of the phase modulator at the joint to the optical propagation path is formed such that, when two light beams split by the optical distributing and coupling unit are emitted from the phase modulator toward the optical propagation path, an optical path difference is obtained between the two reflected beams from the end surface, said end surface being formed to be smooth with a tilt of a predetermined angle relative to the direction of the propagation of the light in a plane containing the two light beams, the predetermined angle being selected to satisfy the following formulas:

$$L_R = 2n_w \cdot H_w \cdot \tan(90° - \alpha),$$

and $$\exp(-(\pi L_R/(\ln 2)^{\frac{1}{2}}/L_c)^2) \leq \beta \cdot SF,$$

where $L_R$ indicates an optical path difference between the two reflected beams, $n_w$ a refractive index of an optical waveguide portion in the phase modulator, $H_w$ a width between the optical waveguides in the optical distributing and coupling unit, $L_c$ a coherent length of a light beam having information on the phase difference of light based on Sagnac effect, $\beta$ a bias fluctuation width required in the fiber optical gyro; and SF an optical scale factor.

* * * * *

UNITED STATES PATENT AND TRADEMARK OFFICE
CERTIFICATE OF CORRECTION

PATENT NO. : 5,412,471

DATED : May 2, 1995

INVENTOR(S) : Tada et al.

It is certified that error appears in the above-identified patent and that said Letters Patent is hereby corrected as shown below:

Title page, item
[75], Inventors "Kurokawa; Akihiro," should read --Akihiro Kurokawa;--

Title page, item
[75], Inventors: insert -- shi-- after the word "Kamakura"

Col. 6, line 22 delete "a" after the word "output"

Col. 7, line 42 "All" should read --A11-- (#11)

Col. 8, line 8 "All" should read --A11-- (#11)

Col. 8, line 50 insert --it-- after the word "result"

Col. 8, line 55 "All" should read --A11-- (#11)

Col. 8, line 57 "All" should read --A11-- (#11)

Col. 10, line 36 insert --.-- after the word "embodiment"

Col. 11, line 32 "All" should read --A11-- (#11)

Col. 12, line 47 "All" should read --A11-- (#11)

UNITED STATES PATENT AND TRADEMARK OFFICE
CERTIFICATE OF CORRECTION

PATENT NO. : 5,412,471

DATED : May 2, 1995

INVENTOR(S) : Tada et al.

It is certified that error appears in the above-identified patent and that said Letters Patent is hereby corrected as shown below:

Col. 12, line 56 "All" should read --A11-- (#11)

Col. 12, line 61 "All" should read --A11-- (#11)

Col. 17, line 13 "$\pi/\eta$," should read --$\pi/\tau$,--

Col. 17, line 15 "<1" should read --<<1--

Col. 18, line 37 "$\theta[\phi R]$" should read --$\gamma[\phi R]$--

Col. 18, line 54 insert --K-- after the word "coefficient"

Signed and Sealed this

Eleventh Day of February, 1997

Attest:

BRUCE LEHMAN

Attesting Officer     Commissioner of Patents and Trademarks